(12) United States Patent
Watanabe et al.

(10) Patent No.: US 10,380,732 B2
(45) Date of Patent: Aug. 13, 2019

(54) CONTROLLER, FORMING MACHINE, AND CONTROL METHOD

(71) Applicant: KOMATSU INDUSTRIES CORPORATION, Kanazawa-shi, Ishikawa (JP)

(72) Inventors: Tetsuyou Watanabe, Kanazawa (JP); Takeshi Kobayashi, Kanazawa (JP); Shuhei Yamashita, Kanazawa (JP)

(73) Assignee: KOMATSU INDUSTRIES CORPORATION, Kanazawa-shi, Ishikawa (JP)

( * ) Notice: Subject to any disclaimer, the term of this patent is extended or adjusted under 35 U.S.C. 154(b) by 290 days.

(21) Appl. No.: 15/351,840

(22) Filed: Nov. 15, 2016

(65) Prior Publication Data

US 2017/0352148 A1 Dec. 7, 2017

(30) Foreign Application Priority Data

Jun. 2, 2016 (JP) .................................. 2016-111097

(51) Int. Cl.
*A61B 6/00* (2006.01)
*G06T 7/00* (2017.01)
(Continued)

(52) U.S. Cl.
CPC .......... *G06T 7/0008* (2013.01); *G06K 9/4642* (2013.01); *G06K 9/52* (2013.01); *G06K 9/6215* (2013.01); *G06T 7/11* (2017.01); *G06T 7/194* (2017.01); *G06T 7/254* (2017.01); *G06K 2209/19* (2013.01);
(Continued)

(58) Field of Classification Search
None
See application file for complete search history.

(56) References Cited

U.S. PATENT DOCUMENTS

2010/0067742 A1* 3/2010 Ogawa ............... G06K 9/00369
382/103
2010/0220184 A1* 9/2010 Appleyard ............. B21D 55/00
348/86

(Continued)

FOREIGN PATENT DOCUMENTS

| JP | S60-107115 A | | 6/1985 |
|---|---|---|---|
| JP | 2006-061958 A | | 3/2006 |
| JP | 2006061958 A | * | 3/2006 |

*Primary Examiner* — Iman K Kholdebarin
(74) *Attorney, Agent, or Firm* — Drinker Biddle & Reath LLP

(57) ABSTRACT

A system controller serving as a controller for controlling a forming machine acquires, from a sensor which outputs image data for determining a distance in a height direction by sensing a predetermined area including a machining area of the forming machine, background image data not including an image of a workpiece and an operator of the forming machine, and current state image data representing a current state of the predetermined area during operation of the forming machine. The system controller calculates difference data indicating a difference between the background image data and the current state image data, and determines an area of the operator in the predetermined area based on the difference data. The system controller controls operation speed of the forming machine based on a result of the determination.

12 Claims, 26 Drawing Sheets

(51) Int. Cl.
  *G06K 9/46*    (2006.01)
  *G06K 9/52*    (2006.01)
  *G06K 9/62*    (2006.01)
  *G06T 7/11*    (2017.01)
  *G06T 7/254*   (2017.01)
  *G06T 7/194*   (2017.01)

(52) U.S. Cl.
  CPC ............... *G06T 2207/20021* (2013.01); *G06T 2207/20224* (2013.01); *G06T 2207/30164* (2013.01)

(56) References Cited

U.S. PATENT DOCUMENTS

2013/0058535 A1* 3/2013 Othmezouri ....... G06K 9/00369
                                                    382/103
2017/0344838 A1* 11/2017 Zhou .................. G06K 9/00355
2017/0352148 A1* 12/2017 Watanabe ............ G06K 9/4642

\* cited by examiner

FIG.26

| OPERATION SPEED TABLE | |
|---|---|
| AREA | SPEED |
| A1 | STOP |
| A2 | 10% |
| A3 | 20% |
| A4 | 30% |
| A5 | 40% |
| A6 | 60% |
| A7 | 80% |
| A8 | 100% |

CONTROLLER, FORMING MACHINE, AND CONTROL METHOD

BACKGROUND OF THE INVENTION

Field of the Invention

The present invention relates to a controller for controlling operation of a forming machine, the forming machine including the controller, and a method for controlling the forming machine.

Description of the Background Art

Forming machines such as press machines and press brakes have been conventionally known.

Japanese Patent Laying-Open No. 60-107115 discloses a method for controlling a feeder that automatically feeds work (workpiece) to a press brake. In Japanese Patent Laying-Open No. 60-107115, an image pickup device is disposed so as to be able to pick up an image of a state in which the work is fed to the press brake. In addition, the control method of Japanese Patent Laying-Open No. 60-107115 computes a difference corresponding to the same pixel of the image pickup device between a binarized signal when picking up an image of a background not including the work and a binarized signal when picking up an image of the background including the work therein, to extract a binarized signal of only the work. Moreover, this control method computes a position of the work based on the binarized signal of only the work, and controls the feeder based on the computed position.

Japanese Patent Laying-Open No. 2006-061958 discloses a press brake including a CCD camera, an image processor, and an abnormality detection unit. Specifically, the CCD camera picks up an image of a prescribed area of visual field in the vicinity of a portion to be bent of a work surface. The image processor determines whether or not there is an image of a hand of an operator within the prescribed area of visual field from the image picked up by the CCD camera. Based on a signal from the image processor, the abnormality detection unit performs control so as to stop the operation of a ram when there is an image of a hand of the operator within the prescribed area of visual field.

SUMMARY OF THE INVENTION

However, although the position of the work can be computed, the position of the operator cannot be computed in Japanese Patent Laying-Open No. 60-107115.

In Japanese Patent Laying-Open No. 2006-061958, as described above, the image picked up by the CCD camera is used in determining whether or not there is an image of a hand of the operator. An image obtained by a CCD camera, however, is readily influenced by the surrounding environment. In particular, as the brightness of working space varies by lighting and the like, image data output from a CCD camera varies.

Thus, if the position of an operator can be detected with higher accuracy than the accuracy attained with a configuration using a CCD camera, the convenience of a forming machine such as a press brake can be improved for the operator.

The present disclosure has been made in view of the aforementioned problem, and an object of the present disclosure is to provide a controller capable of reflecting more accurately the actual position of an operator in control of operation speed of a forming machine, the forming machine including the controller, and a control method for controlling operation of the forming machine.

According to an aspect of the present disclosure, a controller controls operation of a forming machine for forming a workpiece. The controller includes: an acquisition unit configured to acquire, from a sensor which outputs image data for determining a distance in a height direction by sensing a predetermined area including a machining area of the forming machine, first image data not including an image of the workpiece and an operator of the forming machine, and second image data representing a current state of the predetermined area during operation of the forming machine, as the image data; a determination unit configured to calculate difference data indicating a difference between the first image data and the second image data, and to determine an area of the operator in the predetermined area based on the difference data; and a speed control unit configured to control operation speed of the forming machine based on a result of the determination by the determination unit.

According to the above configuration, the area of the operator can be distinguished using the image data obtained from the sensor which outputs image data for determining a distance in the height direction. This image data is less likely to be influenced by the surrounding environment than image data obtained by a CCD camera or the like. Thus, the area of the operator can be determined with high accuracy. Accordingly, the actual position of the operator can be reflected more accurately in the control of the operation speed of the forming machine.

Preferably, the determination unit is further configured to determine an area of the workpiece based on the difference data.

According to the above configuration, the controller can distinguish between the workpiece and the operator. Accordingly, it is possible to control the operation speed in consideration of the position of the workpiece as well.

Preferably, the workpiece has a flat worked surface. The determination unit is configured to determine a flat area of the workpiece as the determination of the area of the workpiece.

A workpiece having a flat worked surface is constant (horizontal) in the height direction during normal forming operation, and thus can be more readily distinguished than a non-flat worked surface. Accordingly, the area of the workpiece can be distinguished with higher accuracy.

Preferably, the determination unit includes a feature value calculation unit configured to divide a difference image based on the difference data into a plurality of cells, and to calculate a HOG (Histogram of Oriented Gradients) feature value in the difference data for each of the cells, and a similarity calculation unit configured to calculate similarity between the HOG feature value and a feature value of a shape of the workpiece for each of the cells. The determination unit is configured to determine the area of the operator and the area of the workpiece based on the calculated similarity.

According to the above configuration, the area of the workpiece and the area of the operator can be determined by using the feature value of the shape of the workpiece.

Preferably, the determination unit includes a feature value calculation unit configured to divide a difference image based on the difference data into a plurality of cells, and to calculate a normal vector of an edge portion in the difference data for each of the cells, and a similarity calculation unit configured to calculate similarity between the normal vector and a vector representing a feature of a shape of the workpiece for each of the cells. The determination unit is configured to determine the area of the operator and the area of the workpiece based on the calculated similarity.

According to the above configuration, the area of the workpiece and the area of the operator can be determined by using the vector representing the feature of the shape of the workpiece.

Preferably, the determination unit is configured to determine that an area including a prescribed proportion or more of the cells in which the similarity is less than a reference value is the area of the operator.

According to the above configuration, the area of the operator can be determined based on the similarity calculated by the similarity calculation unit.

Preferably, the determination unit is configured to determine that an area including a prescribed proportion or more of the cells in which the similarity is equal to or greater than a reference value is the area of the workpiece.

According to the above configuration, the area of the workpiece can be determined based on the similarity calculated by the similarity calculation unit.

Preferably, the determination unit is further configured to determine an inclined area inclined at a prescribed angle based on the difference data. The speed control unit is configured to limit the operation speed when the inclined area is equal to or larger than a predetermined size.

When forming a workpiece having a flat worked surface, machining accuracy decreases unless the worked surface is placed horizontally. According to the above configuration, if the inclined area is equal to or larger than the predetermined size, it can be determined that the worked surface is not placed horizontally, so that decrease in machining accuracy can be prevented by limiting the operation speed.

Preferably, the speed control unit is configured to stop a forming process when the inclined area is equal to or larger than the predetermined size.

According to the above configuration, the forming process can be prevented from being performed when the worked surface is not horizontally placed.

According to another aspect of the present disclosure, a forming machine forms a workpiece. The forming machine includes: a body having a machining area where the workpiece is machined; a controller for controlling operation of the forming machine; and a sensor which outputs image data for determining a distance in a height direction by sensing a predetermined area including the machining area of the forming machine. The controller is configured to acquire, from the sensor, first image data not including an image of the workpiece and an operator of the forming machine, and second image data representing a current state of the predetermined area during operation of the forming machine, as the image data. The controller is configured to determine an area of the operator in the predetermined area based on difference data indicating a difference between the first image data and the second image data. The controller is configured to control operation of the forming machine based on a result of the determination.

According to the above configuration, the area of the operator can be distinguished using the image data obtained from the sensor which outputs image data for determining a distance in the height direction. This image data is less likely to be influenced by the surrounding environment than image data obtained by a CCD camera or the like. Thus, the area of the operator can be determined with high accuracy. Accordingly, the forming machine can reflect more accurately the actual position of the operator in the control of the operation speed.

Preferably, the sensor is mounted on the body above the machining area.

According to the above configuration, the predetermined area including the machining area can be sensed.

Preferably, the forming machine is a press machine.

According to the above configuration, in the press machine, it is possible to control the operation speed (press speed) while reflecting the actual position of the operator more accurately.

According to yet another aspect of the present disclosure, a control method is for controlling operation of a forming machine for forming a workpiece. The control method includes the steps of: acquiring, from a sensor which outputs image data for determining a distance in a height direction by sensing a predetermined area including a machining area of the forming machine, first image data not including an image of the workpiece and an operator of the forming machine, as the image data; after acquiring the first image data, acquiring, from the sensor, second image data representing a current state of the predetermined area during operation of the forming machine, as the image data; calculating difference data indicating a difference between the first image data and the second image data; determining an area of the operator in the predetermined area based on the difference data; and controlling operation of the forming machine based on a result of the determination.

According to the above configuration, the area of the operator can be distinguished using the image data obtained from the sensor which outputs image data for determining a distance in the height direction. This image data is less likely to be influenced by the surrounding environment than image data obtained by a CCD camera or the like. Accordingly, the area of the operator can be determined with high accuracy. Therefore, the actual position of the operator can be reflected more accurately in the control of the operation speed of the forming machine.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 26 is a diagram illustrating an operation speed limitation table included in a speed control unit.

DESCRIPTION OF THE PREFERRED EMBODIMENTS

In the following description, the same components are designated by the same signs. Their names and functions are also identical. Thus, detailed description thereof will not be repeated.

In this embodiment, a press machine will be described as an example forming machine. In addition, a member having a flat worked surface will be described as an example workpiece to be pressed by the press machine. In particular, a short size plate will be described as an example workpiece.

It is to be noted that the forming machine is not limited to a press machine, but may be another machine such as a press brake. In addition, the workpiece does not need to have a flat worked surface. It is only required that at least each workpiece to be machined have a certain shape.

<A. Overall Configuration>

Figure 1:
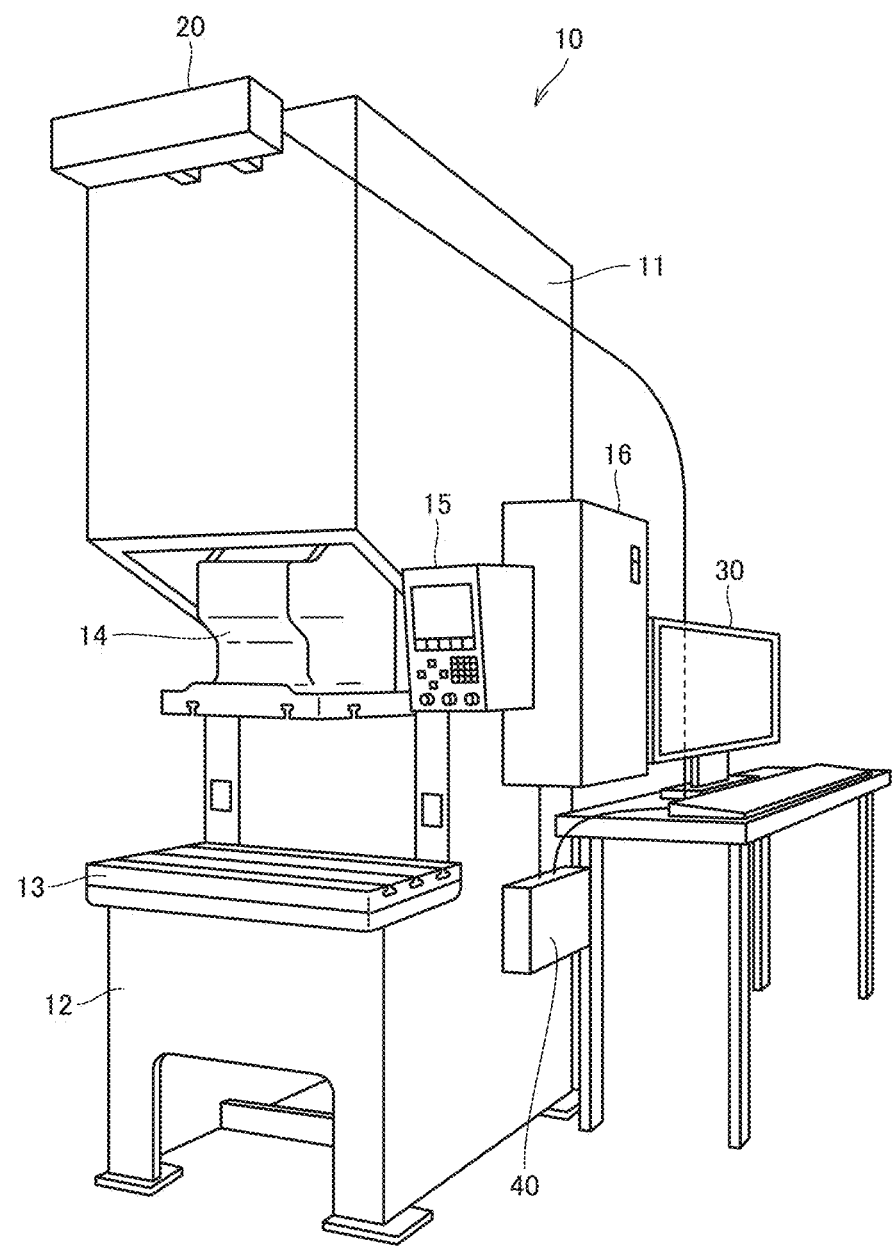
FIG. 1 is a diagram illustrating the configuration of a press system.

FIG. 1 is a diagram illustrating the configuration of a press system 1.

As shown in FIG. 1, press system 1 includes a press machine 10, a sensor 20, an information processor 30, and an input/output terminal 40. Information processor 30 is connected so as to be able to communicate with sensor 20 and input/output terminal 40. Input/output terminal 40 is further connected so as to be able to communicate with press machine 10.

Press machine 10 includes a body frame 1, a bed 12, a bolster 13, a slide 14, a control panel 15, and a press controller 16.

Slide 14 is supported on a substantially central portion of body frame 11 such that slide 14 can move up and down. Bolster 13 mounted on bed 12 is disposed below slide 14. Control panel 15 is provided at the front of body frame 11. Press controller 16 connected to control panel 15 is provided on the side of body frame 11.

A not-shown upper die is mounted on the lower surface of slide 14. A not-shown lower die is mounted on the upper surface of bolster 13. A prescribed workpiece corresponding to a die formed of the upper and lower dies is positioned on the lower die, and the upper die is moved down with slide 14, to perform pressing.

Control panel 15 is for inputting various types of data required to control press machine 10, and has switches and a numeric keypad through which the data is input, as well as a display for displaying a setting screen and data output from press machine 10.

Control panel 15 may include a device for receiving data from an external storage medium such as an IC card having preset data stored therein, or a communication device to transmit/receive data wirelessly or via communication lines.

It is to be noted that the above configuration of press machine 10 is exemplary and is not particularly limiting.

Press controller 16 of press machine 10 is a device to control the entire press machine 10. Press controller 16 is connected to control panel 15 and input/output terminal 40. Press controller 16 is configured to include a computer device which is mainly formed of a CPU, a high-speed numerical operation processor, a memory and the like, and which performs arithmetic and logical operations of input data in accordance with a predetermined procedure, and an input/output interface which inputs/outputs a command current.

The memory of press controller 16 is configured to include an appropriate storage medium such as a ROM or RAM. This memory stores a program that allows press controller 16 to implement various functions. This memory is also used as a work area where various types of arithmetic processing are performed.

Sensor 20 is a depth sensor. Sensor 20 is mounted on body frame 11 above a machining area of press machine 10.

Sensor 20 transmits image data for determining a distance in a height direction to information processor 30 through a communication cable, by sensing a predetermined area including the machining area (hereinafter also referred to as a "work area"). The image data output from sensor 20 will be described later.

Information processor 30 acquires the image data from sensor 20. Information processor 30 performs various types of arithmetic processing based on the image data acquired from the sensor. For example, information processor 30 calculates a HOG (Histogram of Oriented Gradients) feature value. Information processor 30 also transmits a signal in accordance with a result of the processing to press controller 16 of press machine 10.

The specific contents of the processing in information processor 30 and a hardware configuration of information processor 30 will be described later.

Figure 2:
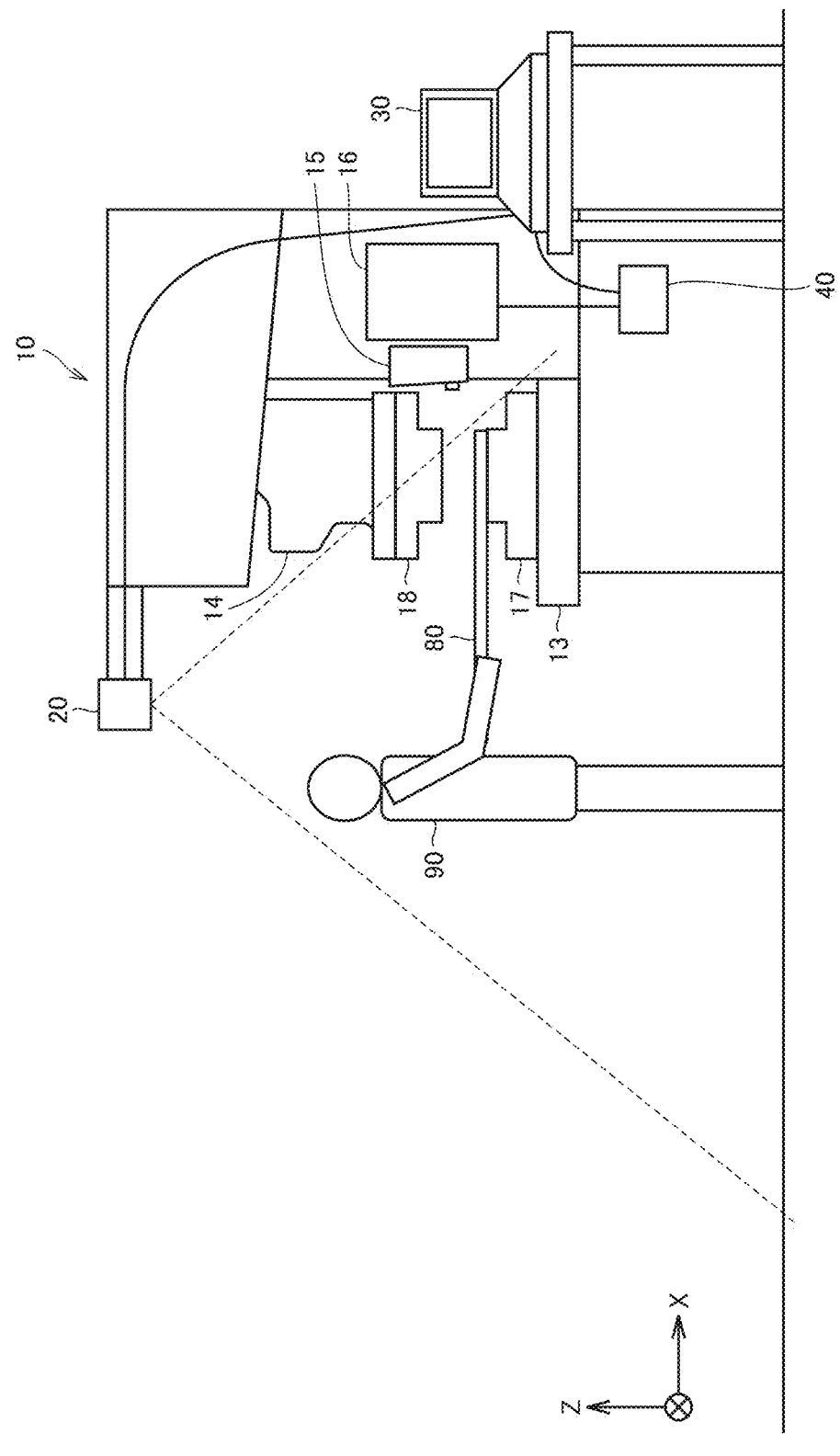
FIG. 2 is a diagram representing a state in which an operator is performing pressing operation within a work area.

FIG. 2 is a diagram representing a state in which an operator is performing pressing operation within the work area.

As shown in FIG. 2, an operator 90 moves a short size plate 80 as work to the machining area of press machine 10 while grasping short size plate 80. Operator 90 also places short size plate 80 on a lower die 17, with a flat worked surface of short size plate 80 facing an upper die 18. Slide 14 moves down in this state, causing short size plate 80 to be pressed by the dies.

In the state of FIG. 2, operator 90 and short size plate 80 are present in the work area, and therefore, operator 90 and short size plate 80 are also sensed by sensor 20.

Although the above description refers to an example configuration in which press system 1 has information processor 30 separately from press controller 16, this is not limiting. Press controller 16 may be configured so as to perform various types of arithmetic processing in information processor 30. In such a configuration, press system 1 does not need to include information processor 30 and the input/output terminal.

<B. Overview of Processing>

An overview of processing in press system 1 is described. Specifically, an overview of arithmetic processing in information processor 30 and an overview of operation of press machine 10 based on the arithmetic result will be described.

(b1. Arithmetic Processing in Information Processor 30)

Information processor 30 acquires image data representing a background image of the work area (hereinafter also referred to as "background image data") from sensor 20 in advance. Specifically, before the pressing is started, information processor 30 acquires image data not including an image of short size plate 80 and operator 90 of press machine 10 from sensor 20.

Figure 3:
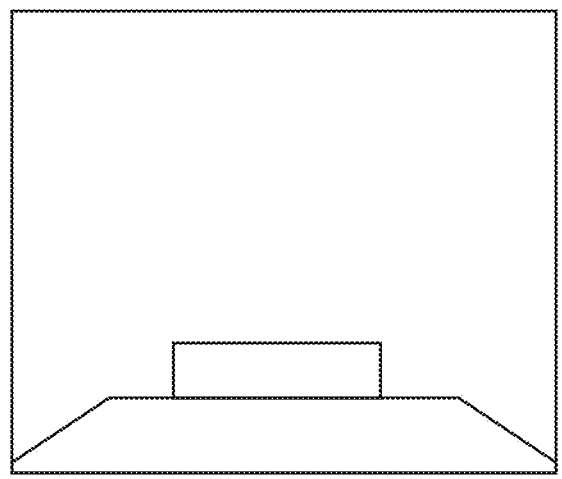
FIG. 3 is a schematic diagram representing a background image.

FIG. 3 is a schematic diagram representing the background image. As shown in FIG. 3, the background image includes an image of press machine 10, an image of the machining area, and an image of a floor surface of working space in which press machine 10 has been installed.

After acquiring the background image data, at least for a period of time during which press machine 10 is operating (typically, slide 14 is moving up and down), information processor 30 acquires image data of the work area at prescribed timing (typically in a prescribed cycle) (hereinafter also referred to as "current state image data") from sensor 20. For example, in one aspect, information processor 30 acquires the current state image data including images of short size plate 80 and operator 90 from sensor 20 in a prescribed cycle. An image based on the current state image data will be hereinafter also referred to as a "current state image."

It is to be noted that the acquisition of the image data from sensor 20 may be based on an acquisition request from information processor 30. Alternatively, sensor 20 may be configured to transmit the image data to information processor 30 without an acquisition request from information processor 30.

Figure 4:
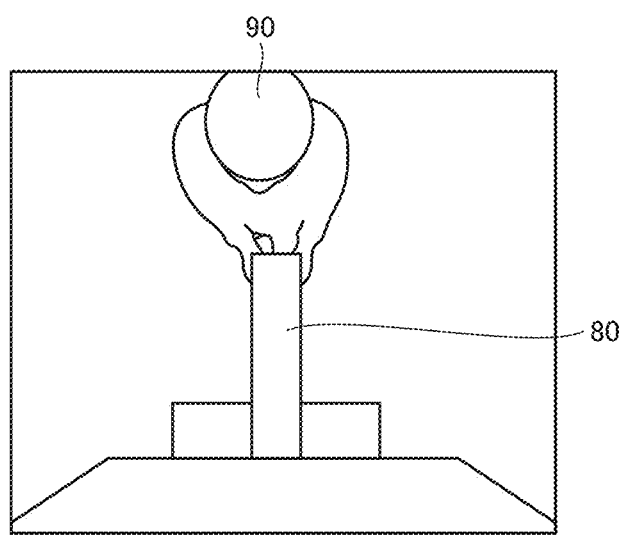
FIG. 4 is a schematic diagram representing an example of a current state image.

FIG. 4 is a schematic diagram representing an example of the current state image. As shown in FIG. 4, in one aspect, the current state image includes an image of press machine 10, an image of the machining area, an image of the floor surface of the working space, an image of operator 90, and an image of short size plate 80.

Information processor 30 calculates difference data indicating a difference between the current state image data and the background image data. Typically, information processor 30 calculates the difference data each time the current state image data is acquired from sensor 20. Specifically, information processor 30 calculates the difference data by subtracting the background image data (pixel value) from the current state image data (pixel value) for each pixel of sensor 20.

It is to be noted that information processor 30 does not need to calculate the difference data each time the current state image data is acquired from sensor 20. A cycle of the acquisition of the current state image data does not need to match a cycle of the calculation of the difference data. For example, after the image data is acquired multiple times, difference data between the last acquired current state image data of the multiple acquisitions and the background image data may be calculated.

Figure 5:
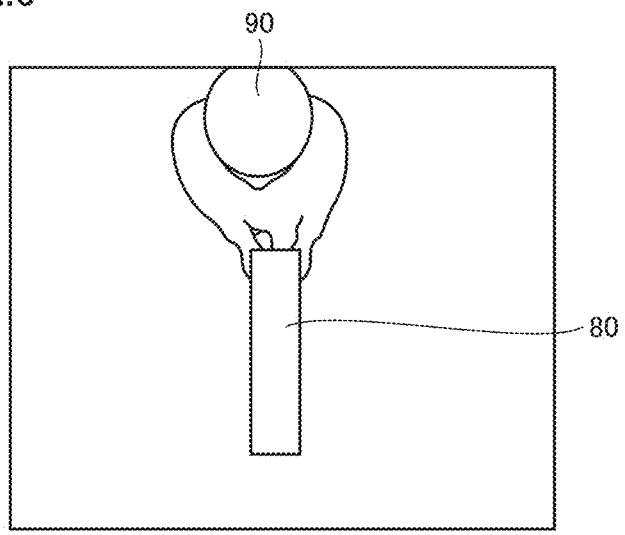
FIG. 5 is a schematic diagram representing a difference image based on difference data.

FIG. 5 is a schematic diagram representing a difference image based on the difference data. In the difference data, pixel values of an area other than the areas of operator 90 and short size plate 80 (area around an object that has entered the work area) are offset. Accordingly, as shown in FIG. 5, information processor 30 can distinguish between the areas of operator 90 and the short size plate and the other area in the difference data.

Since slide 14 moves up and down, the position of slide 14 when the background image data is acquired may be different from the position of slide 14 when the current state image data is acquired. That is, data of a portion of slide 14 may remain in the difference data. However, an area (region) where slide 14 can be present in the difference data can be identified in advance, so that information processor 30 can distinguish between the areas of operator 90 and short size plate 80 and the other area.

Information processor 30 further determines the area of operator 90 and the area of short size plate 80 based on the difference data. Specifically, information processor 30 distinguishes between the area of operator 90 and the area of short size plate 80 through a process of calculating similarity using a HOG feature value.

Figure 6:
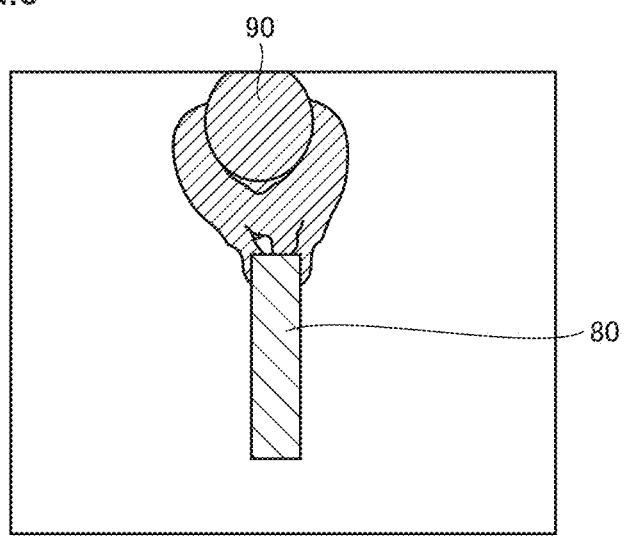
FIG. 6 is a diagram representing determined areas of the operator and of a short size plate.

FIG. 6 is a diagram representing the determined areas of operator 90 and of short size plate 80. As shown in FIG. 6, the position of operator 90 and the position of short size plate 80 can be identified through the arithmetic processing by information processor 30.

Information processor 30 transmits a signal in accordance with a result of the determination to press controller 16 of press machine 10 through input/output terminal 40. The signal in accordance with the determination result may be positional data on the operator and positional data on the short size plate themselves, or may be a separation distance between the operator and the machining area. Alternatively, the signal in accordance with the determination result may be a signal indicative of, when the separation distance between the operator and the machining area is partitioned into a plurality of sections (areas), which section the signal belongs to (area determination signal).

It is to be noted that "sensor 20," "background image data," "current state image data" and "work area" are examples of a "sensor," "first image data," "second image data" and "predetermination area" of the present invention, respectively.

(b2. Operation of Press Machine 10 Based on Arithmetic Result)

Press machine 10 controls operation speed based on the signal in accordance with the determination result received from information processor 30. For example, press machine 10 reduces a press speed (specifically, a movement speed of slide 14) when operator 90 moves closer to the machining area, and increases the press speed when operator 90 moves away from the machining area. As a result, safer pressing operation than heretofore possible can be implemented. The control of the operation speed will be described later in detail.

<C. Functional Configuration>

Figure 7:
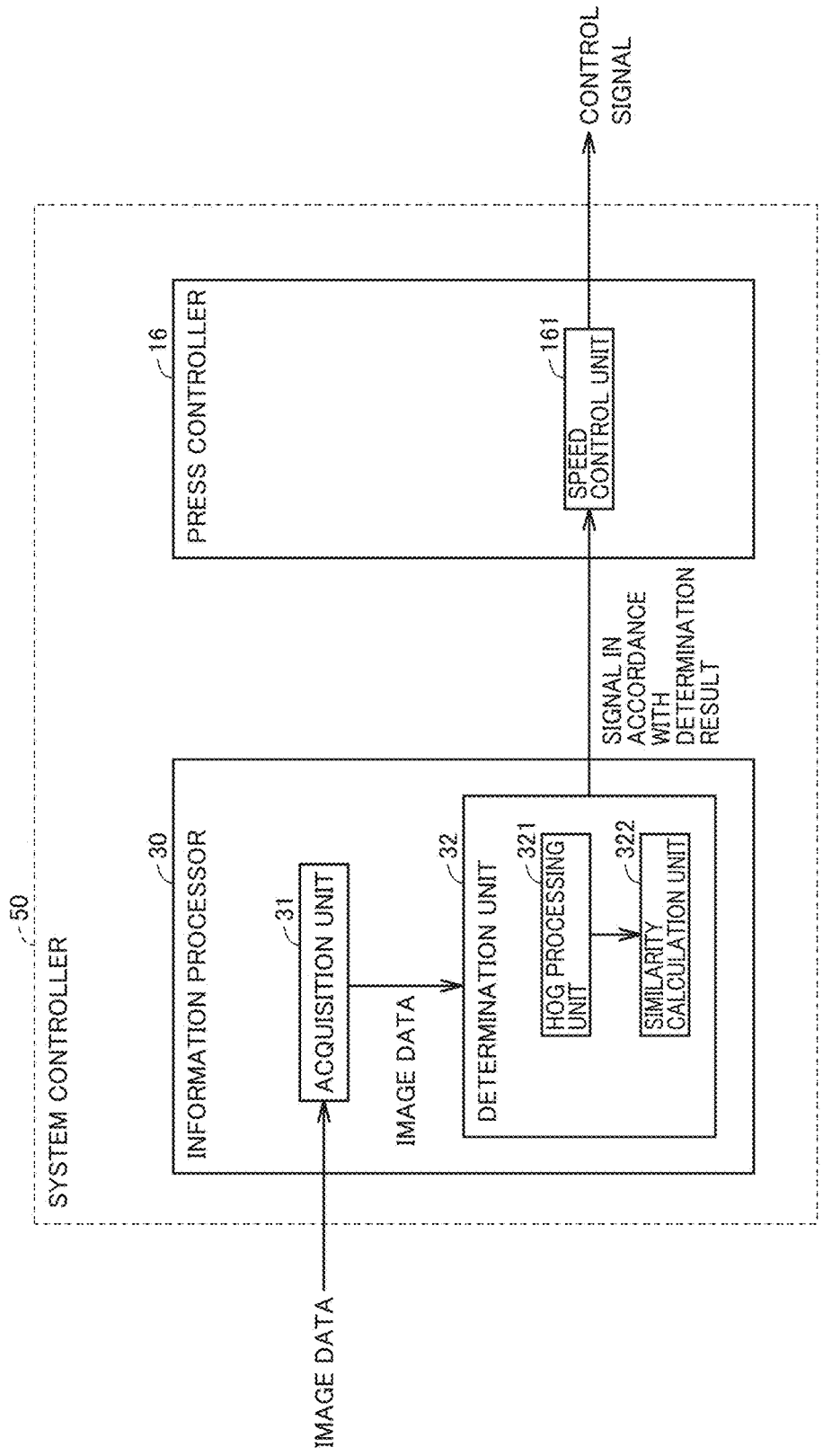
FIG. 7 is a functional block diagram illustrating a functional configuration of an information processor and a press controller.

FIG. 7 is a functional block diagram illustrating a functional configuration of information processor 30 and press controller 16. It is to be noted that a "system controller 50"

configured to include information processor 30 and press controller 16 is an example of a "controller" of the present invention.

Information processor 30 includes an acquisition unit 31 and a determination unit 32. Determination unit 32 includes a HOG processing unit 321 and a similarity calculation unit 322. Press controller 16 includes a speed control unit 161.

Acquisition unit 31 acquires background image data and current state image data from sensor 20. Acquisition unit 31 acquires the current state image data in a cyclic fashion. Acquisition unit 31 transmits the acquired background image data and current state image data to determination unit 32.

Determination unit 32 calculates difference data between the background image data and the current state image data, and determines the area of operator 90 and the area of short size plate 80 based on the difference data. Specifically, determination unit 32 performs this area determination process using HOG processing unit 321 and similarity calculation unit 322.

HOG processing unit 321 divides the difference image into a plurality of cells. Typically, HOG processing unit 321 divides the difference image into a plurality of unit areas. Furthermore, HOG processing unit 321 calculates a HOG feature value in the difference data for each cell. HOG processing unit 321 transmits the calculated HOG feature value to similarity calculation unit 322.

Similarity calculation unit 322 calculates, for each cell, similarity between the calculated HOG feature value and a previously stored feature value of the shape of short size plate 80.

Based on the calculated similarity, determination unit 32 determines the area of operator 90 and the area of short size plate 80. Determination unit 32 transmits a signal in accordance with a result of the determination to press controller 16 through input/output terminal 40.

Press controller 16 receives the signal in accordance with the determination result from information processor 30. Speed control unit 161 of press controller 16 controls the operation speed of press machine 10 based on the signal in accordance with the determination result. Specifically, press controller 16 controls the movement speed of slide 14 by generating a control signal for controlling the movement speed of slide 14.

It is to be noted that "acquisition unit 31," "determination unit 32," "HOG processing unit 321" and "similarity calculation unit 322" are examples of an "acquisition unit," a "determination unit," a "feature value calculation unit" and a "similarity calculation unit" of the present invention, respectively.

<D. Specific Examples of Processing>

Described below is a specific example of processing performed in system controller 50 (FIG. 7) based on the actually obtained image data.

(d1. Acquisition of Difference Image)

Figure 8:
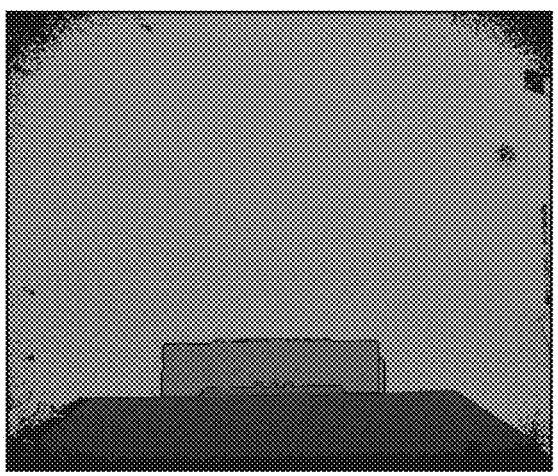
FIG. 8 is a diagram representing a background image based on background image data acquired from a sensor.

FIG. 8 is a diagram representing a background image based on background image data acquired from sensor 20. Specifically, FIG. 8 is a diagram representing a background image displayed on a display of information processor 30. As shown in FIG. 8, the background image is typically displayed as a gray scale image. The background image has shades according to the distance in the height direction from sensor 20. The background image is darker in color as the distance from sensor 20 decreases, and is lighter in color as the distance from sensor 20 increases.

Figure 9:
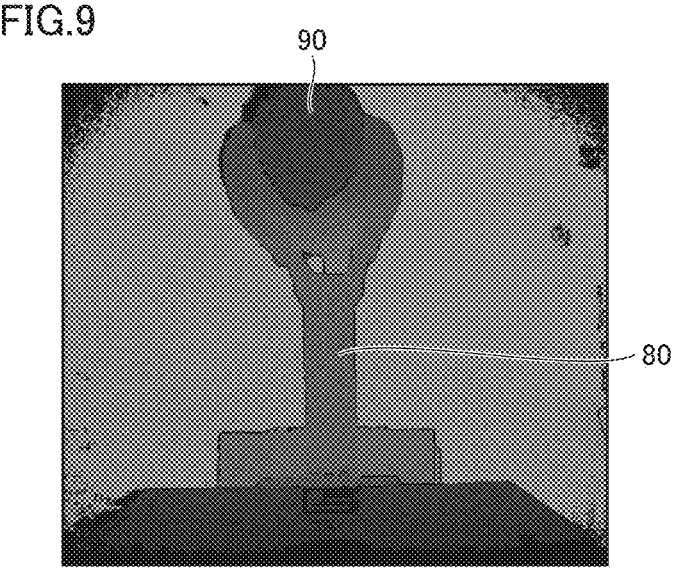
FIG. 9 is a diagram representing a current state image based on current state image data acquired from the sensor.

FIG. 9 is a diagram representing a current state image based on current state image data acquired from sensor 20.

Specifically, FIG. 9 is a diagram representing a current state image displayed on the display of information processor 30. As with the background image, the current state image is typically displayed as a gray scale image.

As shown in FIG. 9, the current state image is different from the background image shown in FIG. 8 in that it includes the image of operator 90 and the image of short size plate 80.

Figure 10:
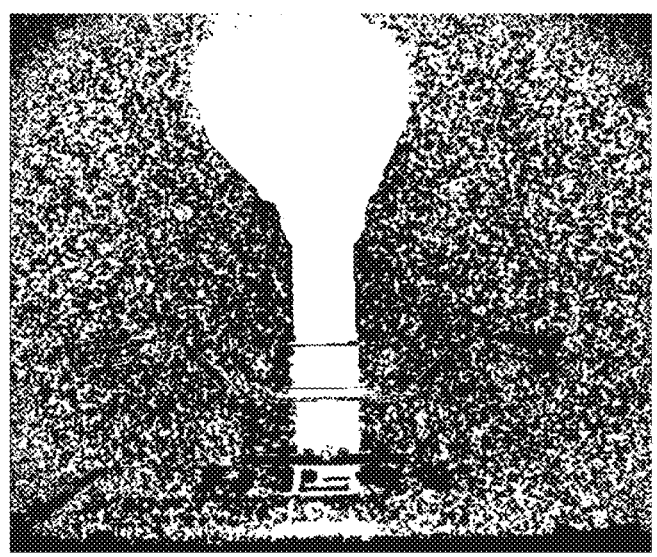
FIG. 10 is a diagram representing a difference image based on difference data.

FIG. 10 is a diagram representing a difference image based on difference data. Specifically, FIG. 10 is a diagram of a difference image between the background image shown in FIG. 8 and the current state image shown in FIG. 9, which is displayed on the display of information processor 30.

As shown in FIG. 10, it can be seen in the difference image that the area of operator 90 and the area of short size plate 80 are generally white in color. Moreover, as can be seen from the difference image, the difference data includes noise. Thus, information processor 30 performs a process of removing the noise from the difference data. This noise removal process is performed, for example, in determination unit 32.

Figure 11:
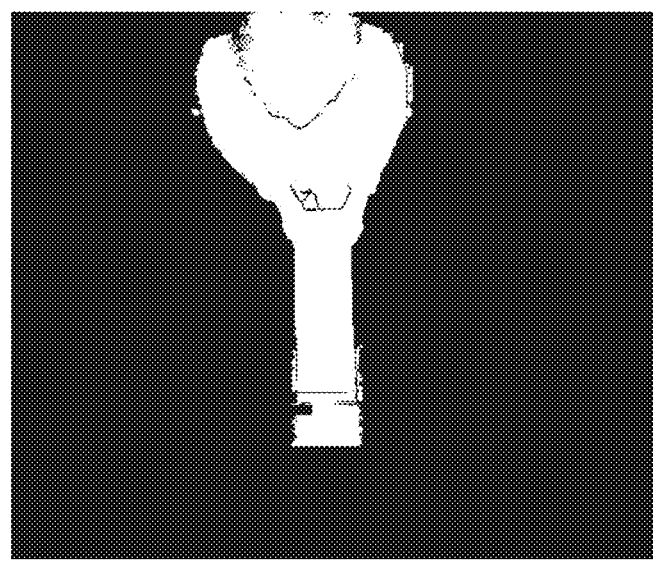
FIG. 11 is a diagram representing the difference image based on the difference data after noise has been removed.

FIG. 11 is a diagram representing the difference image based on the difference data after the noise has been removed. As shown in FIG. 11, in the difference image after the noise removal, the difference between the areas of operator 90 and short size plate 80 and the other area is clarified.

(d2. HOG Processing)

Described below is a process performed in HOG processing unit 321 of information processor 30 (FIG. 7). The HOG processing is performed on the difference data after the noise removal.

Figure 12:
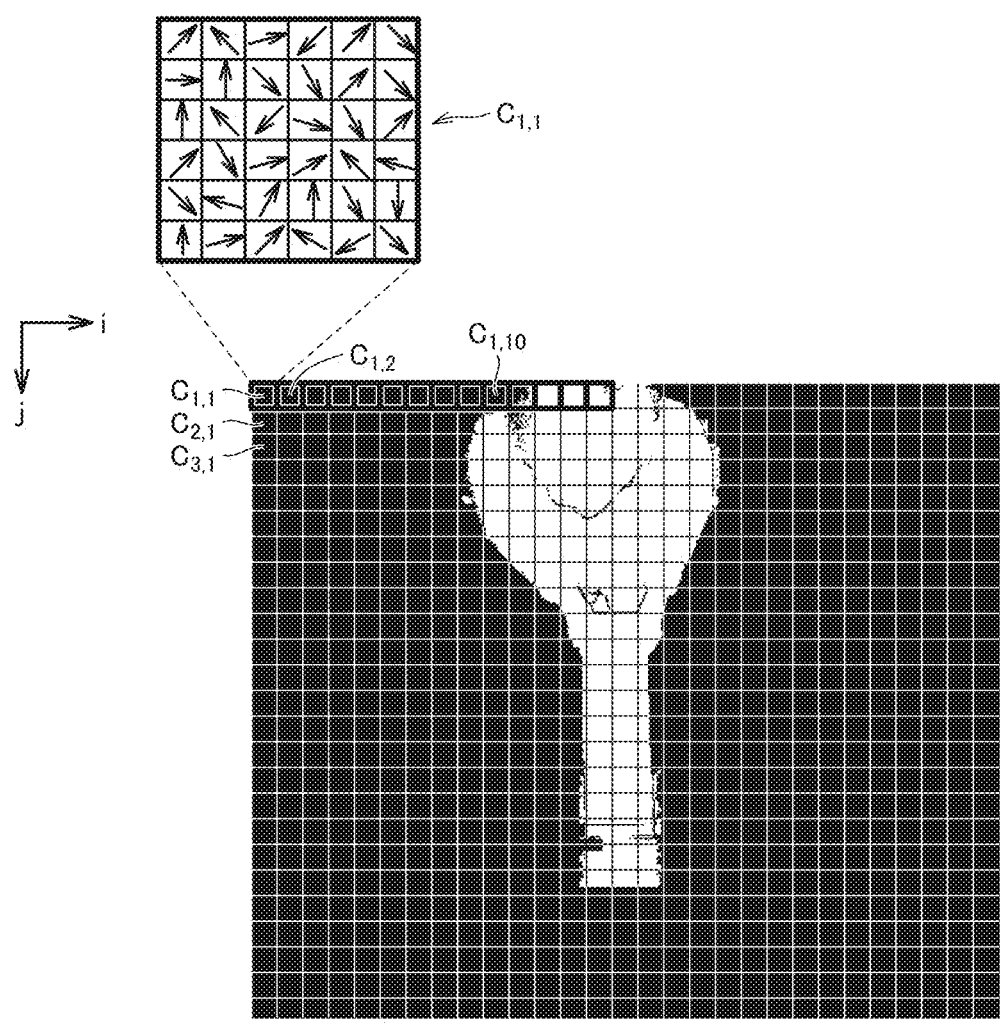
FIG. 12 is a diagram illustrating a method of calculating a HOG feature value.

FIG. 12 is a diagram illustrating a method of calculating a HOG feature value. As shown in FIG. 12, HOG processing unit 321 divides the difference image into a plurality of cells $C_{i,j}$ (i and j are natural numbers equal to or greater than one). Each cell $C_{i,j}$ is typically a square, which consists of 36 pixels including six vertical pixels and six horizontal pixels, for example.

HOG processing unit 321 calculates a gradient vector in each pixel. Specifically, HOG processing unit 321 calculates an orientation in which the brightness varies (gradient orientation: 0° to 180°) and brightness difference (gradient intensity). In FIG. 12, the gradient vector in each pixel of a cell $C_{1,1}$ is schematically represented in a visualized manner. It is to be noted that only the gradient orientation may be calculated, without calculation of the gradient intensity.

HOG processing unit 321 further divides an angle of between 0° and 180° into nine orientations in increments of from 0° to 20°. HOG processing unit 321 creates a histogram, for each cell $C_{i,j}$, which has a horizontal axis representing nine angles (0°, 20°, 40°, ..., 140°, 160°) and a vertical axis representing a sum (frequency) of gradient intensities of these angles.

Figure 13:
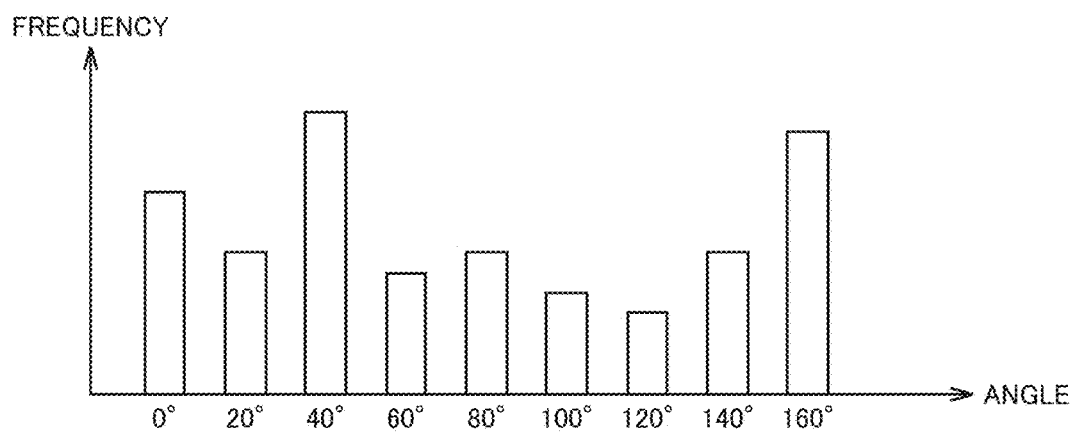
FIG. 13 is a diagram representing an example histogram (HOG feature value) of a cell $C_{i,j}$.

FIG. 13 is a diagram representing an example histogram (HOG feature value) of a single cell $C_{i,j}$. As shown in FIG. 13, the frequency is determined for each of the nine angles. In the following description, a HOG feature value $F_{i,j}$ in each cell $C_{i,j}$ is represented as a nine-dimensional vector as expressed in the following equation (1), for example:

$$F_{i,j} = \{f_1, f_2, f_3, f_4, f_5, f_6, f_7, f_8, f_9\} \quad (1)$$

It is to be noted that $f_1, f_2, f_3, \ldots, f_9$ correspond to 0°, 20°, 40°, ..., 160°, respectively.

HOG processing unit 321 performs a normalization process for each block consisting of a plurality of cells. Each block consists of nine cells including three vertical cells and three horizontal cells, for example.

Figure 14:
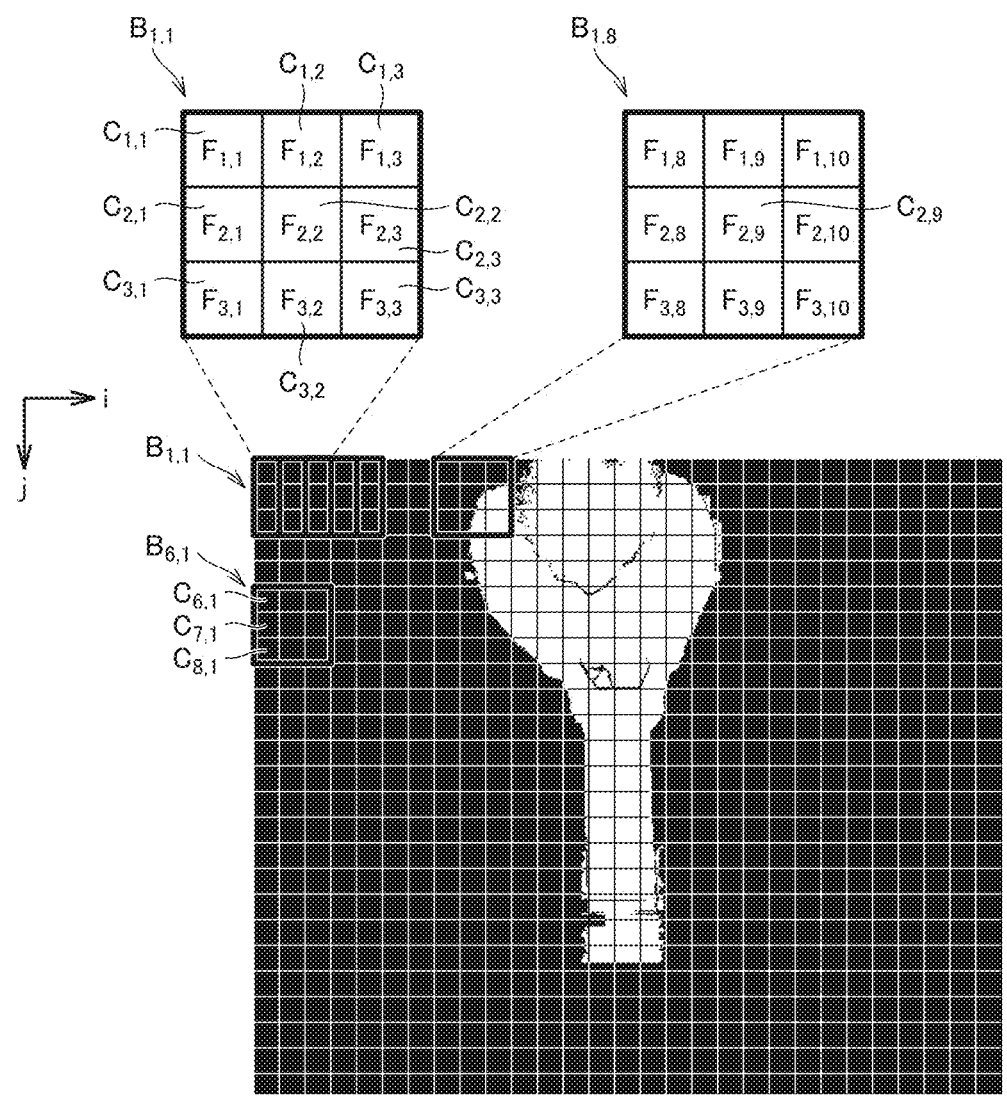
FIG. 14 is a diagram illustrating blocks and a normalization process.

FIG. 14 is a diagram illustrating the blocks and the normalization process. As shown in FIG. 14, a block $B_{i,j}$ consists of a cell $C_{i,j}$, a cell $C_{i,j-1}$, a cell $C_{i,j+2}$, a cell $C_{i+1,j}$, a cell $C_{i+1,j+1}$, a cell $C_{i+1,j+2}$, a cell $C_{i+2,j}$, a cell $C_{i-2,j+2}$, and a cell $C_{i-2,j+2}$.

FIG. 14 illustrates a block $B_{1,1}$, a block $B_{1,8}$, and a block $B_{6,1}$. In particular, for block $B_{1,1}$ and block $B_{1,8}$, the cells forming each block and HOG feature value $F_{i,j}$ in each cell are illustrated.

HOG processing unit 321 normalizes cell $C_{i+1,j+1}$ at the center of each block $B_{i,j}$ using the HOG feature values of eight cells around this cell $C_{i+1,j+1}$ (the other cells in this block). Looking at block $B_{1,1}$, for example, a central cell $C_{2,2}$ is normalized using the HOG feature values of eight cells around cell $C_{2,2}$ (specifically, cells $C_{1,1}$, $C_{1,2}$, $C_{1,3}$, $C_{2,1}$, $C_{2,3}$, $C_{3,1}$, $C_{3,2}$, $C_{3,3}$).

Specifically, HOG processing unit 321 performs the normalization process for each block using the following equation (2), and calculates a HOG feature value v after the normalization of each cell $C_{i,j}$:

$$v_{i+1,j+1} = \frac{F_{i+1,j+1}}{\sqrt{\|V\|_k^2 + \varepsilon^2}} \quad (2)$$

In the equation (2), V represents a vector defined by the HOG feature values of nine cells included in block $B_{i,j}$ ($F_{i,j}$, $F_{i,j+1}$, $F_{i,j+2}$, $F_{i+1,j}$, $F_{i+1,j+1}$, $F_{i+1,j+2}$, $F_{i+2,j}$, $F_{i-2,j+1}$, $F_{i+2,j+2}$). An L1 norm is represented when a subscript k of the norm is 1, an L2 norm is represented when k is 2, and an L∞ norm is represented when k is ∞. In this embodiment, ε has a value of 1.

Figure 15:
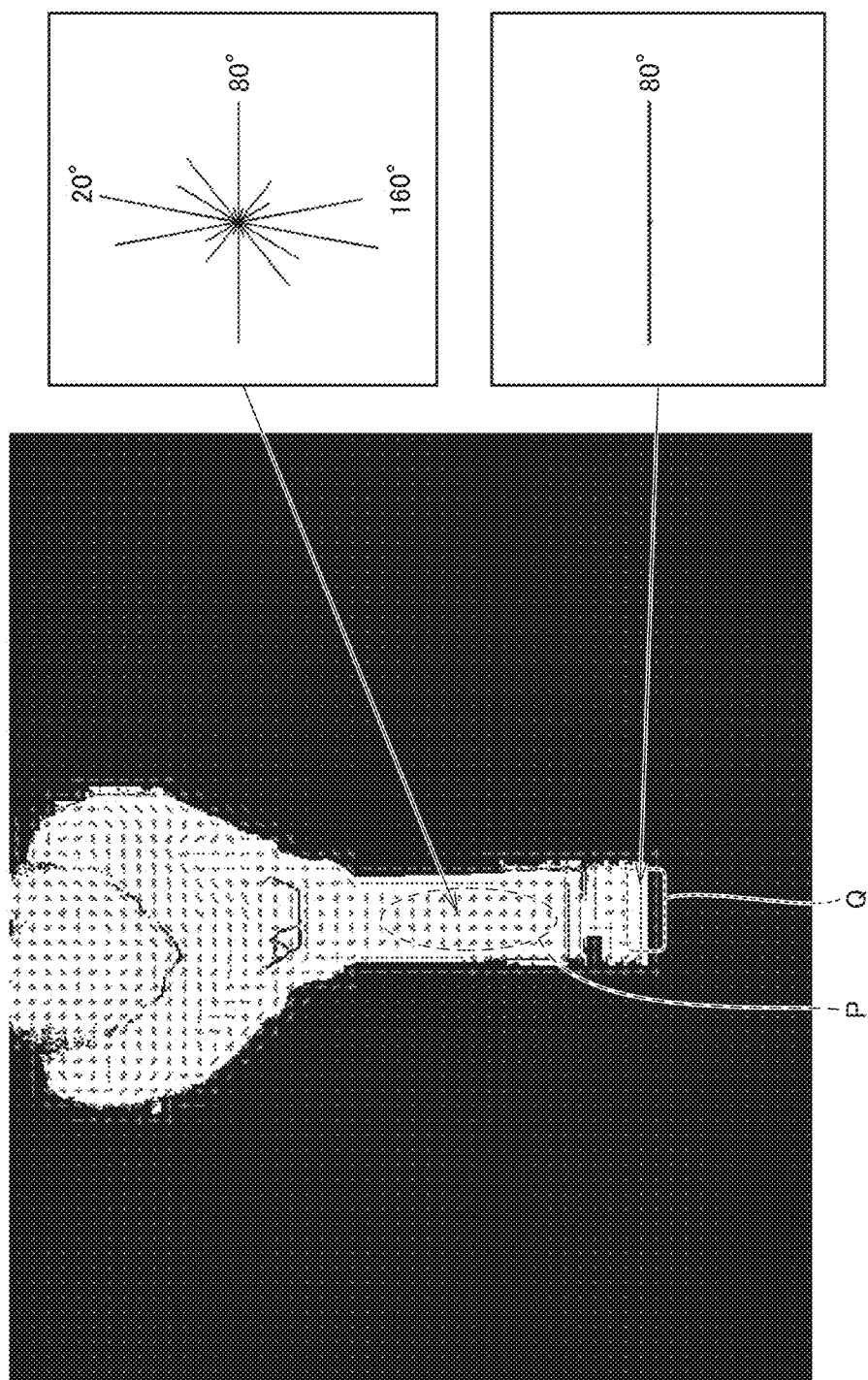
FIG. 15 is a diagram visualizing the HOG feature values after the normalization.

FIG. 15 is a diagram visualizing the HOG feature values after the normalization. In FIG. 15, the HOG feature value of a single cell in an area P at the worked surface of short size plate 80, and the HOG feature value of a single cell in an area Q at an end portion (edge) of short size plate 80 are displayed in an enlarged manner.

The area of short size plate 80 is formed by a linear contour and a flat surface. On the other hand, the area of operator 90 is formed by a curvilinear contour and a rounded surface. Thus, the HOG feature values with different tendencies will be obtained from the area of short size plate 80 and the area of operator 90. For example, the HOG feature value obtained in the area of operator 90 indicates a tendency different from those of the two HOG feature values displayed in an enlarged manner in FIG. 15.

Determination unit 32 distinguishes between the area of operator 90 and the area of short size plate 80 by utilizing such difference in tendency between the HOG feature values. Specifically, determination unit 32 distinguishes between the area of operator 90 and the area of short size plate 80 based on the similarity calculated by similarity calculation unit 322.

Since there is no object present in the surrounding area other than the areas of operator 90 and short size plate 80, a HOG feature value unique to this surrounding area is obtained. Thus, determination unit 32 can exclude the surrounding area when distinguishing between the area of operator 90 and the area of short size plate 80.

(d3. Calculation of Similarity)

Described below is the process of calculating the similarity by similarity calculation unit 322.

Similarity calculation unit 322 calculates, for each cell $C_{i,j}$, the similarity between the HOG feature value (specifically, the HOG feature value after the normalization) and the feature value of the shape of short size plate 80. The feature value of the shape of short size plate 80 is determined in advance by performing the following process.

Information processor 30 calculates an average value of feature vectors at ten locations of the flat worked surface (horizontally placed worked surface) of short size plate 80. Similarity calculation unit 322 utilizes the calculated average value (feature vector) as a first reference vector $I_{ref1}$. Information processor 30 also calculates an average value of feature vectors at a plurality locations (for example, ten locations) of an edge portion of short size plate 80. Similarity calculation unit 322 utilizes the average value (feature vector) at the edge portion as a second reference vector $I_{ref2}$. It is to be noted that the two reference vectors will be expressed as "$I_{ref}$" when no distinction is made between them.

Figure 16A:
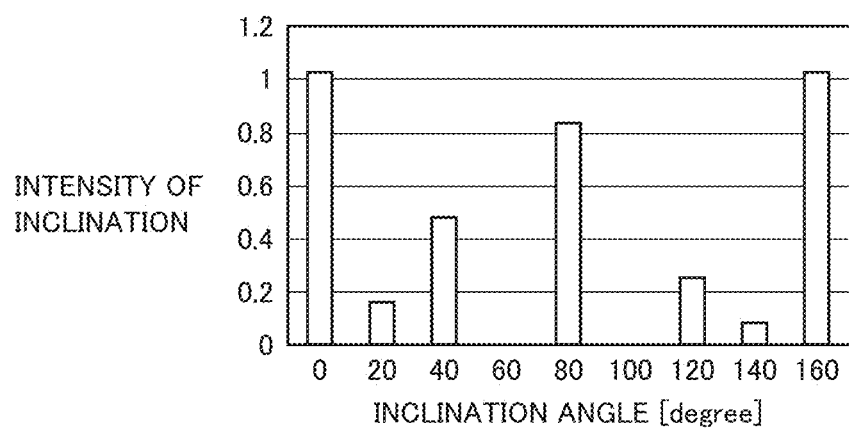
FIGS. 16A and 16B are diagrams representing reference vectors.
Figure 16B:
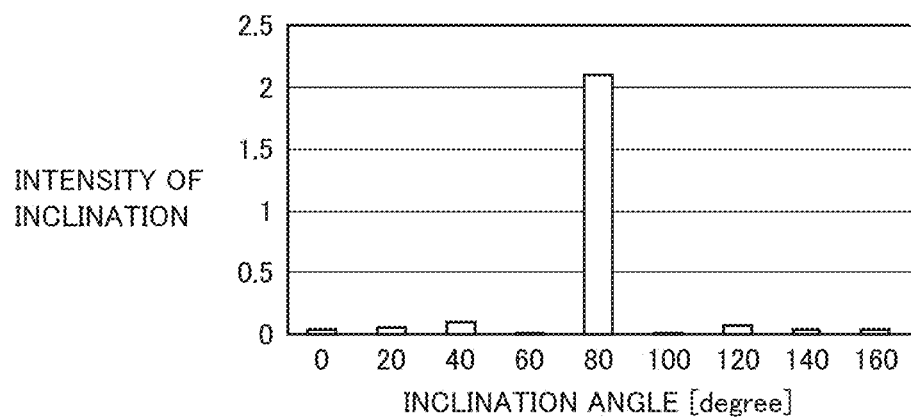

FIGS. 16A and 16B are diagrams representing reference vectors $I_{ref}$. FIG. 16A is a diagram representing an example of first reference vector $I_{ref1}$. FIG. 16B is a diagram representing an example of second reference vector $I_{ref2}$. Referring to FIGS. 16A and 16B, the horizontal axis represents nine inclination angles (0°, 20°, 40°, . . . , 140°, 160°), while the vertical axis represents intensity corresponding to the aforementioned frequency (intensity of inclination).

Similarity calculation unit 322 utilizes reference vectors $I_{ref}$ such as shown in FIGS. 16A and 16B as the feature value of the shape of short size plate 80, to calculate the similarity with the HOG feature value. Typically, similarity calculation unit 322 calculates the similarity using cosine similarity. Specifically, similarity calculation unit 322 calculates the similarity using the following equation (3):

$$\cos(\overrightarrow{I_{ref}}, \overrightarrow{v_{ij}}) = \frac{\overrightarrow{I_{ref}} \cdot \overrightarrow{v_{ij}}}{|\overrightarrow{I_{ref}}||\overrightarrow{v_{ij}}|} \quad (3)$$

Figure 17:
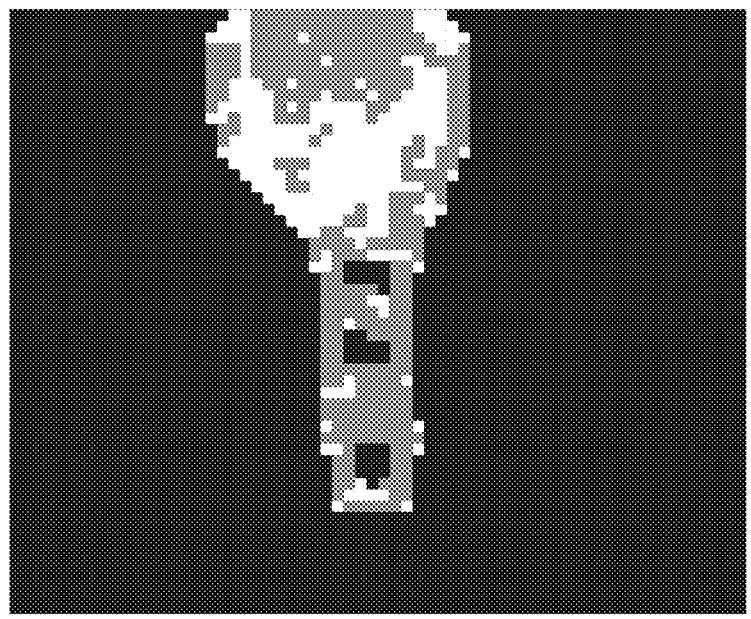
FIG. 17 is a diagram representing an image generated based on calculated similarity.

FIG. 17 is a diagram representing an image generated based on the calculated similarity. As shown in FIG. 17, an area that has been determined to have similarity equal to or greater than a reference value in the difference image, and an area that has been determined to have similarity less than the reference value in the difference image can be distinguished from each other.

Based on the calculated similarity, determination unit 32 determines the area of operator 90 and the area of short size plate 80. Specifically, determination unit 32 determines that an area including a prescribed proportion or more of the cells in which the calculated similarity is less than the reference value is the area of operator 90. Determination unit 32 also determines that an area including a prescribed proportion or more of the cells in which the calculated similarity is equal to or greater than the reference value is the area of short size plate 80. The reference value and the prescribed proportion are defined in advance.

Determination unit 32 transmits a signal in accordance with a result of the determination to press controller 16 through input/output terminal 40, as described above. Press controller 16 controls the operation speed of press machine 10 based on the signal in accordance with the determination result, as described above.

<E. Control Structure>

Figure 18:
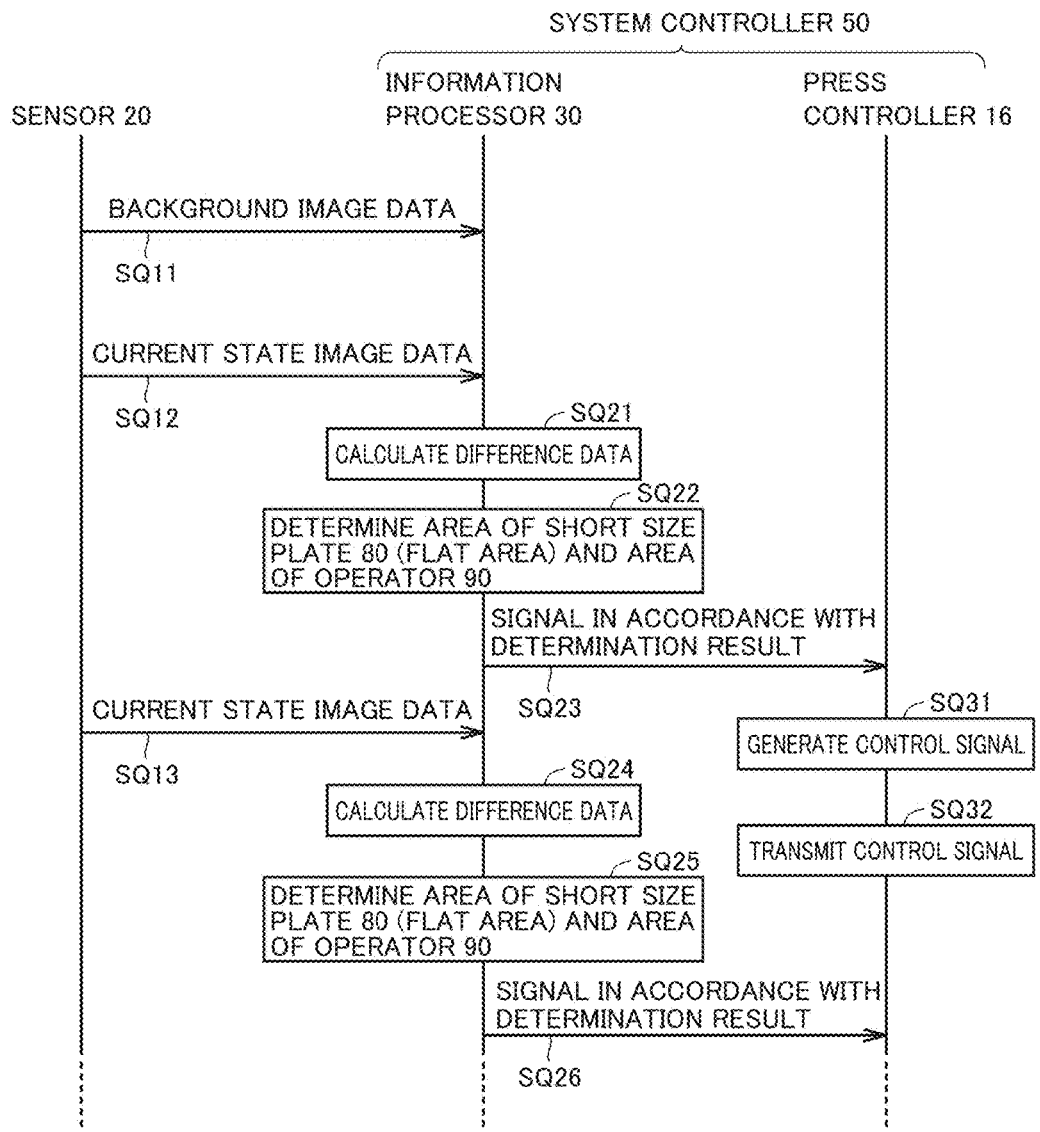
FIG. 18 is a sequence chart illustrating a process flow in the press system.

FIG. 18 is a sequence chart illustrating a process flow in press system 1. As shown in FIG. 18, in a sequence SQ11, sensor 20 transmits background image data to information processor 30. Information processor 30 stores the background image data in the memory. In a sequence SQ12, sensor 20 transmits current state image data. The transmission of the current state image data is typically repeated in a prescribed cycle, as described above.

In a sequence SQ21, information processor 30 calculates difference data between the background image data and the current state image data. Information processor 30 calculates the difference data each time the current state image data is acquired from sensor 20. In a sequence SQ22, information processor 30 determines the area of operator 90 and the area of short size plate 80 based on the difference data. In a sequence SQ23, information processor 30 transmits a signal in accordance with the determination result to press controller 16 of press machine 10.

In a sequence SQ31, press controller 16 generates a control signal for controlling the movement speed of slide 14 based on the signal in accordance with the determination result. In a sequence SQ32, press controller 16 transmits the generated control signal to a drive circuit that operates slide 14.

Subsequently, a process similar to the series of processes indicated by sequences SQ12, SQ21, SQ22, SQ23, SQ31 and SQ32 is repeated. When the next current state image data is received from sensor 20 in a sequence SQ13, in a sequence SQ24, information processor 30 calculates difference data, as in sequence SQ21. Moreover, in a sequence SQ25, information processor 30 determines the area of operator 90 and the area of short size plate 80 based on the difference data calculated in sequence SQ24, as in sequence SQ22. In a sequence SQ26, information processor 30 transmits a signal in accordance with the determination result to press controller 16, as in sequence SQ23.

Figure 19:
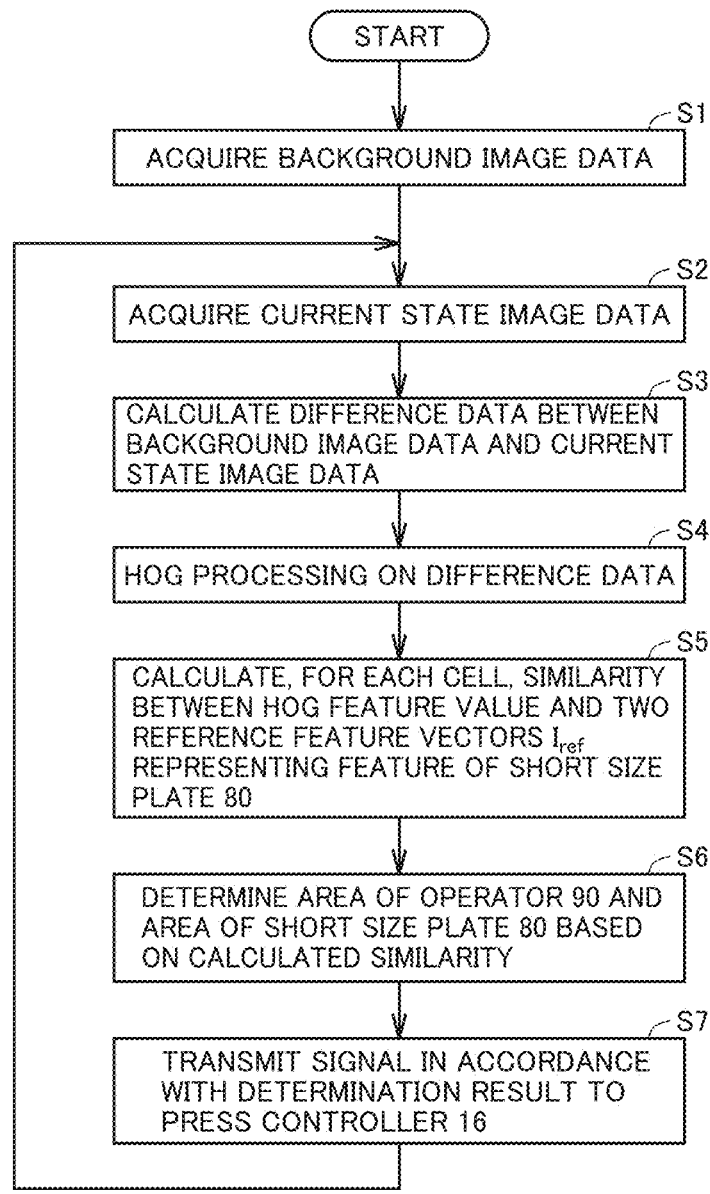
FIG. 19 is a flowchart illustrating a process flow in the information processor.

FIG. 19 is a flowchart illustrating a process flow in information processor 30. As shown in FIG. 19, in step S1, information processor 30 acquires background image data representing the background image of the work area from sensor 20. In step S2, information processor 30 acquires current state image data, which has been obtained by picking up an image of the current state of the work area, from sensor 20.

In step S3, information processor 30 calculates difference data between the background image data and the current state image data by subtracting the background image data from the current state image data. In step S4, information processor 30 performs HOG processing on the calculated difference data. In step S5, information processor 30 calculates, for each cell $C_{i,j}$, similarity between the HOG feature value and the aforementioned two reference vectors $I_{ref}$ representing the feature of short size plate 80.

In step S6, information processor 30 determines the area of operator 90 and the area of short size plate 80 based on the calculated similarity. In step S7, information processor 30 transmits a signal in accordance with the determination result to press controller 16.

<F. Hardware Configuration>

Figure 20:
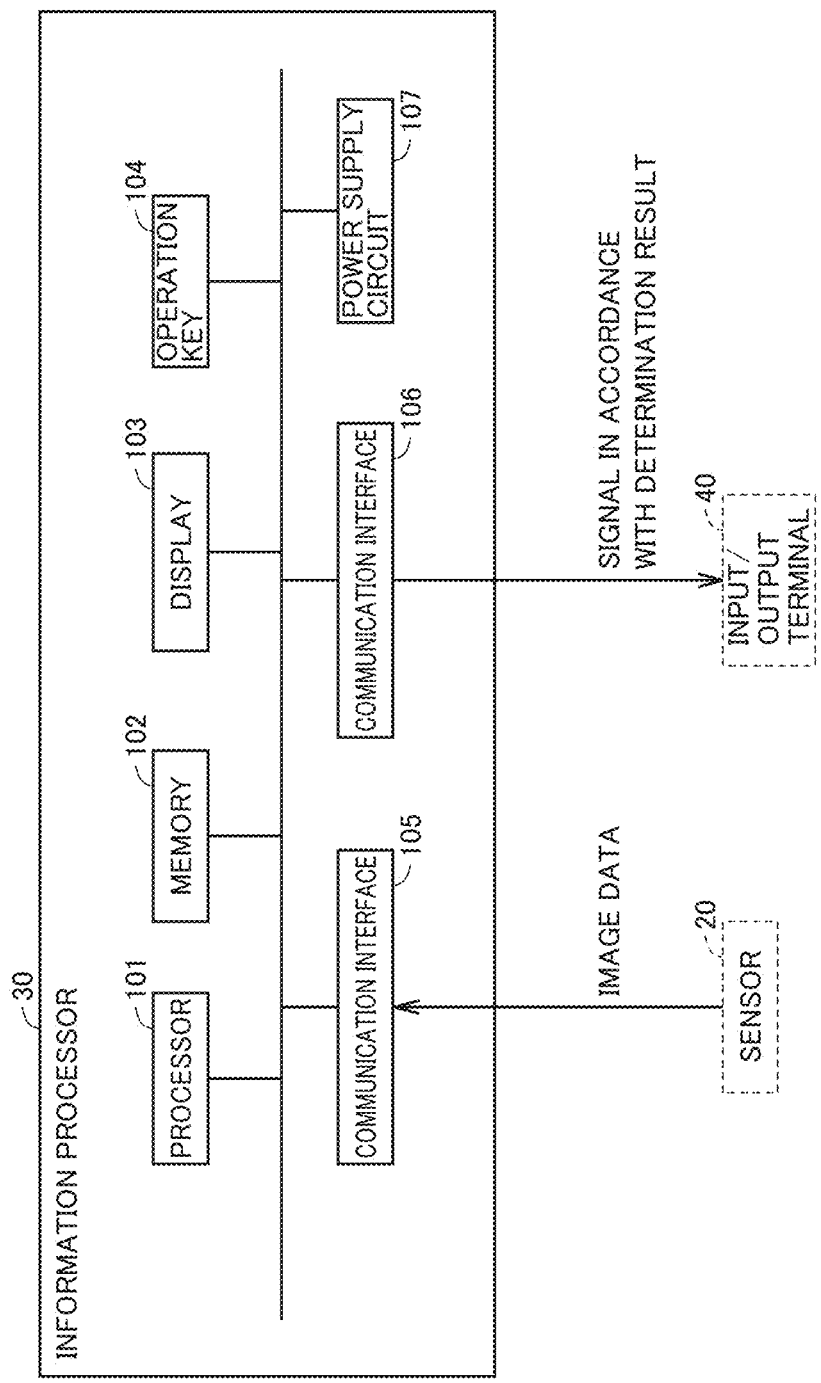
FIG. 20 is a diagram representing a typical hardware configuration of the information processor.

FIG. 20 is a diagram representing a typical hardware configuration of information processor 30. Referring to FIG. 20, information processor 30 includes a processor 101 such as a CPU, a memory 102, a display 103, an operation key 104, communication interfaces 105, 106, and a power supply circuit 107.

Processor 101 controls the entire operation of information processor 30.

Memory 102 stores an operating system, a program for implementing the determination process and the like described above, and various types of data.

Display 103 displays various types of information based on an instruction from processor 101. For example, display 103 displays various types of images such as the background image, the current state image, and the difference image.

Communication interface 105 is a communication processing unit for communicating with sensor 20. Communication interface 105 receives image data output from sensor 20. Communication interface 105 transmits the received image data to processor 101.

Communication interface 106 is a communication processing unit for communicating with input/output terminal 40. Processor 101 transmits a signal in accordance with the determination result to input/output terminal 40 through communication interface 106.

Power supply circuit 107 is a circuit for supplying electric power from a power supply drawn into the working space to each block within information processor 30 and to not-shown circuits.

It is to be noted that acquisition unit 31 shown in FIG. 7 corresponds to communication interface 105. Determination unit 32 shown in FIG. 7 is implemented by processor 101 executing the program stored in memory 102.

<G. Summary of Embodiment>

(1) As discussed above, press system 1 can distinguish the area of operator 90 using the image data obtained from sensor 20 which outputs image data for determining a distance in the height direction. This image data is less likely to be influenced by the surrounding environment than image data obtained by a CCD camera or the like. Thus, press system 1 can determine the area of operator 90 with high accuracy. Accordingly, press system 1 can reflect more accurately the actual position of operator 90 in the control of the operation speed of press machine 10.

(2) Moreover, press system 1 further determines the area of short size plate 80 based on the difference data. Thus, press system 1 can distinguish between the workpiece and the operator. Accordingly, press system 1 can control the operation speed in consideration of the position of short size plate 80 as well.

(3) A workpiece having a flat worked surface like short size plate 80 is constant (horizontal) in the height direction during normal pressing operation, and thus can be more readily distinguished than a non-flat worked surface. Accordingly, press system 1 can distinguish the area of short size plate 80 with higher accuracy.

(4) Moreover, press system 1 can determine the area of short size plate 80 and the area of operator 90 by using the feature value of the shape of short size plate 80 (reference vectors $I_{ref}$ representing the feature). Specifically, press system 1 can determine the area of short size plate 80 and the area of operator 90 based on the similarity calculated by similarity calculation unit 322.

(5) Being mounted on body frame 11 above the machining area, sensor 20 can sense the work area including the machining area.

<H. Variations>

(h1. Determination of Inclination)

In the above embodiment, when the worked surface of short size plate 80 is horizontally placed, the area of short size plate 80 can be determined by utilizing the aforementioned two reference vectors $I_{ref}$. Described below is a process for the case where operator 90 brings short size plate 80 closer to the machining area, with the worked surface of short size plate 80 being inclined from the horizontal plane.

Figure 21:
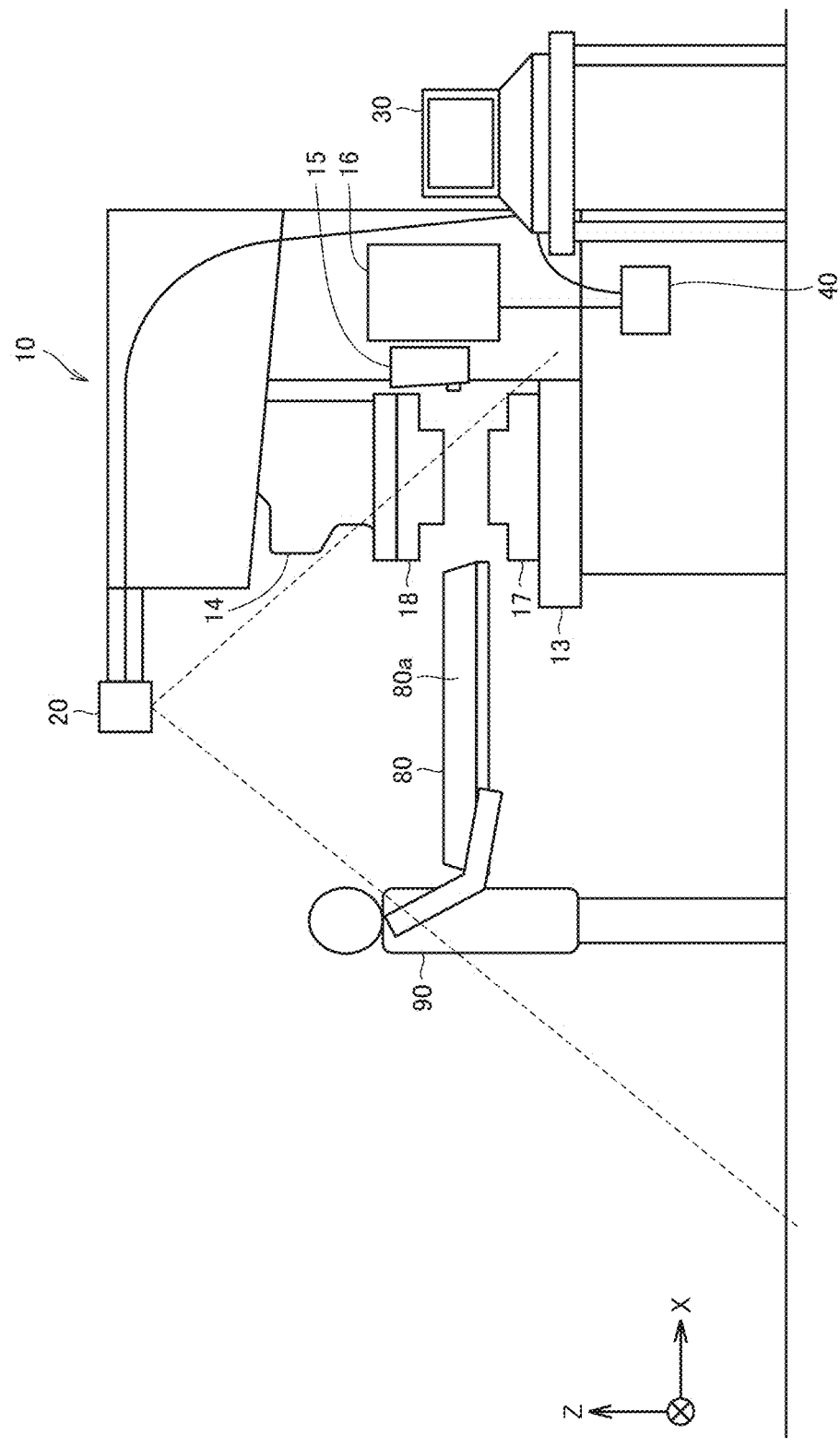
FIG. 21 is a diagram representing a state immediately before the operator starts the pressing operation within the work area.

FIG. 21 is a diagram representing a state immediately before the operator starts the pressing operation within the work area. As shown in FIG. 21, if operator 90 brings short size plate 80 into the machining area, with a worked surface 80a of short size plate 80 being inclined from the horizontal plane, a pressing process may not be able to be performed with high accuracy.

In addition, if short size plate 80 is inclined as shown in FIG. 21, it is likely that information processor 30 will not be able to determine the area of short size plate 80 by means of the aforementioned two reference vectors $I_{ref}$. Thus, determination unit 32 of information processor 30 determines the inclined area inclined at a prescribed angle, together with the area of operator 90, based on the difference data. Determination unit 32 transmits a signal based on a result of the determination to speed control unit 161 of press controller 16.

When the inclined area inclined at a prescribed angle is equal to or larger than a predetermined size, speed control unit 161 limits a press speed of press machine 10. For example, speed control unit 161 causes the pressing process (operation of slide 14) to stop.

By limiting the operation speed in this manner, decrease in machining accuracy can be prevented, thereby maintaining the pressing process with high accuracy. In addition, safer pressing operation than heretofore possible can be implemented. Particularly if the configuration is such that the pressing process is stopped when the inclined area is equal to or larger than the predetermined size as described above, a forming process can be prevented from being performed when the worked surface is not horizontally placed.

(h2. Use of Normal Vector)

Although the above embodiment refers to an example configuration in which the HOG feature value of a cell is calculated by HOG processing unit 321, this is not limiting. Any configuration capable of calculating the feature value of a cell can be employed without being particularly limited. For example, the configuration can be as follows.

First, instead of calculating the HOG feature value, a normal vector of an edge portion in the difference data is calculated for each cell $C_{i,j}$. Moreover, similarity calculation unit 322 calculates, for each $C_{i,j}$, similarity between the calculated normal vector and reference vectors $I_{ref}$ representing the feature of short size plate 80. Then, determination unit 32 determines the area of operator 90 and the area of short size plate 80 based on the calculated similarity.

Such configuration can provide the same effect as that of the embodiment described above.

<I. Mode of Limiting Operation Speed of Press Machine 10>

Next, a mode of setting determination areas based on image data, and appropriately limiting the operation speed of press machine 10 based thereon is described.

Figure 22:
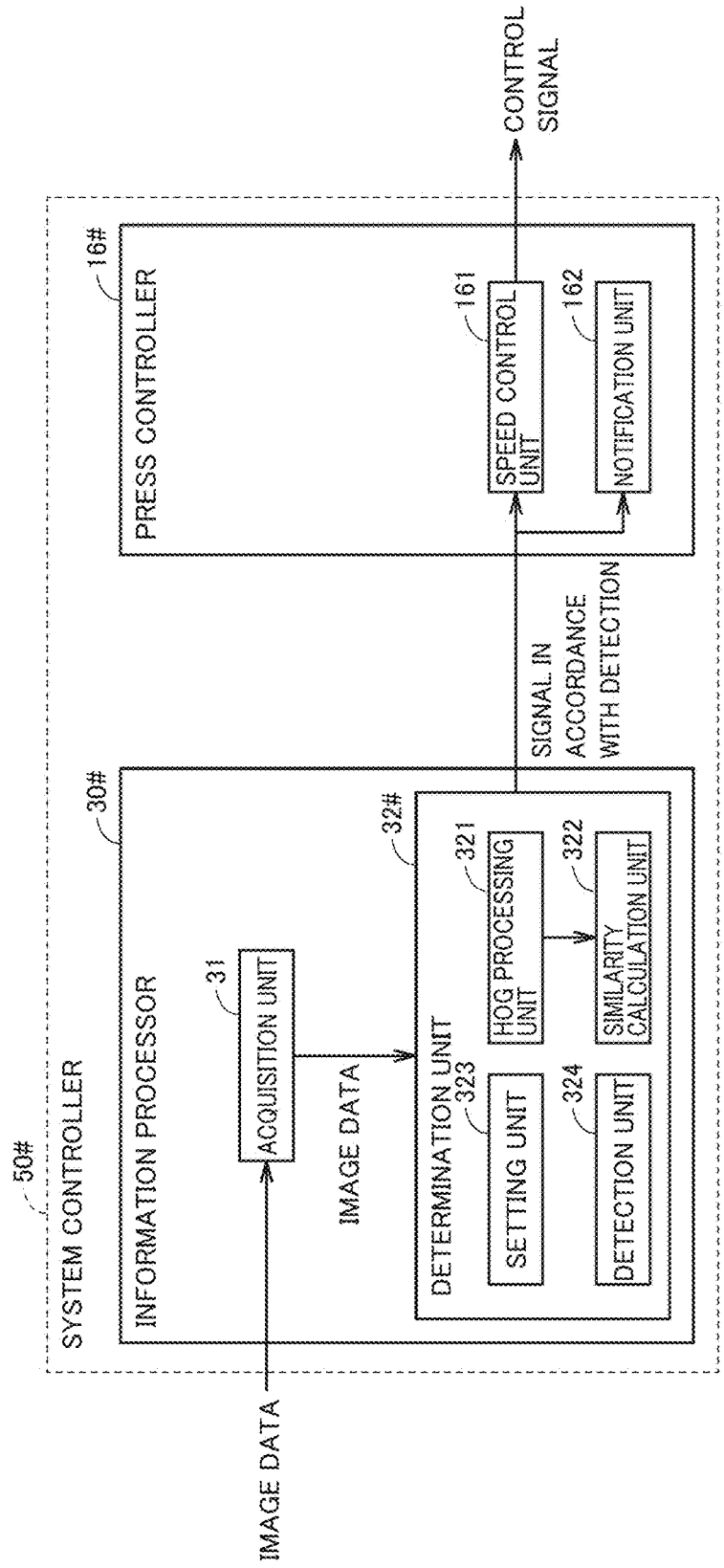
FIG. 22 is a diagram illustrating a functional configuration of a system controller.

FIG. 22 is a diagram illustrating a functional configuration of a system controller 50# based on the embodiment.

Referring to FIG. 22, system controller 50# is different from system controller 50 of FIG. 7 in that information processor 30 has been replaced by an information processor 30# and press controller 16 has been replaced by a press controller 16#.

Information processor 30# is different from information processor 30 in that determination unit 32 has been replaced by a determination unit 32#.

Determination unit 32# is different from determination unit 32 in that it further includes a setting unit 323 and a detection unit 324.

Press controller 16# is different from press controller 16 in that it further includes a notification unit 162. The configuration is otherwise the same as that described with reference to FIG. 7, and thus detailed description thereof will not be repeated.

Determination unit 32# includes HOG processing unit 321 and similarity calculation unit 322, and as described above, calculates the difference data between the background image data and the current state image data acquired by acquisition unit 31.

Then, as described above, the area of operator 90 and the area of short size plate 80 are distinguished by HOG processing unit 321 and similarity calculation unit 322. Thus, the areas of short size plate 80 which is a workpiece and of operator 90 which is an object other than press machine 10 are distinguished.

Setting unit 323 sets a plurality of determination areas based on the image data acquired by acquisition unit 31. Specifically, setting unit 323 extracts the shape of bolster 13 of press machine 10 included in the acquired background image data. Setting unit 323 sets the plurality of determination areas based on the extracted bolster shape.

The plurality of determination areas are used so as to determine whether or not an object (for example, the area of operator 90) determined by the above HOG processing unit 321 and similarity calculation unit 322 has entered each of the determination areas.

Detection unit 324 detects entry of the object (the area of operator 90) into each of the plurality of determination areas that have been set by setting unit 323. Detection unit 324 outputs a signal in accordance with the detection to press controller 16#.

Press controller 16# performs prescribed operation based on the signal in accordance with the detection that has been output from information processor 30#. Specifically, based on the signal in accordance with the detection, speed control unit 161 outputs a control signal for limiting the press speed to press machine 10. Press machine 10 limits the press speed in accordance with the control signal.

Notification unit 162 makes a notification of information based on the signal in accordance with the detection. Specifically, notification unit 162 emits alarm sound or displays information on a not-shown display based on the signal in accordance with the detection.

Figure 23:
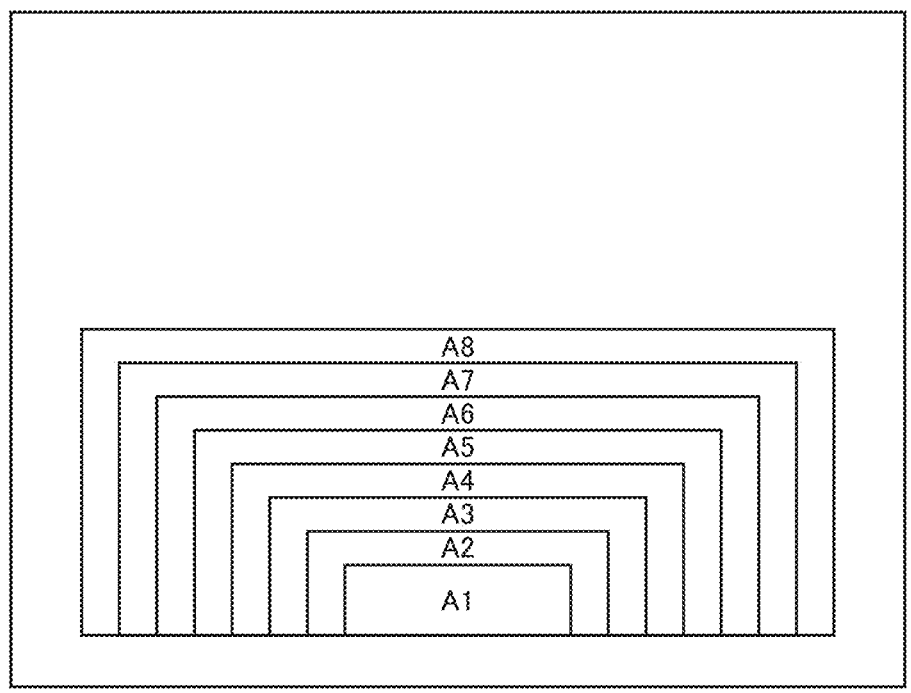
FIG. 23 is a diagram illustrating setting of a plurality of determination areas.

FIG. 23 is a diagram illustrating the setting of the plurality of determination areas based on the embodiment.

Referring to FIG. 23, a plurality of determination areas A1 to A8 are illustrated in this example.

Determination area A1 is an area equivalent to bolster 13 in shape. Bolster 13 is shown to have a rectangular shape in this example. It is to be noted that the corners of bolster 13 do not need to form a right angle as the rectangular shape, but the corners may also be rounded. It is to be noted that determination area A1 does not need to completely match bolster 13 in shape, but is only required to have substantially the same shape.

Bolster 13 in this example can be extracted from image data obtained by sensing the machining area by means of sensor 20 mounted on the upper portion of body frame 11. Specifically, the shape of the bolster can be extracted by pattern matching. Although this example describes extracting the shape of a portion of bolster 13 included in the image data, the shape of the entire bolster 13 may be extracted.

Setting unit 323 extracts the bolster shape based on the image data and sets determination area A1, and sets an additional plurality of determination areas. Specifically, setting unit 323 sets determination areas A2 to A8 by varying a magnification of the size of the bolster shape (determination area A1).

Determination area A1 has the smallest area, and then the determination areas increase in area in ascending order.

The plurality of determination areas are illustrated with varying magnifications, with the lower sides of the four sides of the determination areas being aligned in the same direction. This mode of setting the determination areas is exemplary and not particularly limited. For example, the plurality of determination areas may be set with varying magnifications, with the barycenter of determination area A1 as a reference position.

Since the determination areas are set in accordance with the bolster shape included in the machining area of the image data, the determination areas can be simply set without the need to set them based on manual input or the like for each press machine 10.

Although this example describes setting eight determination areas, the number of determination areas is not particularly limited to eight. The set determination areas may be any number equal to or greater than two.

Figure 24:
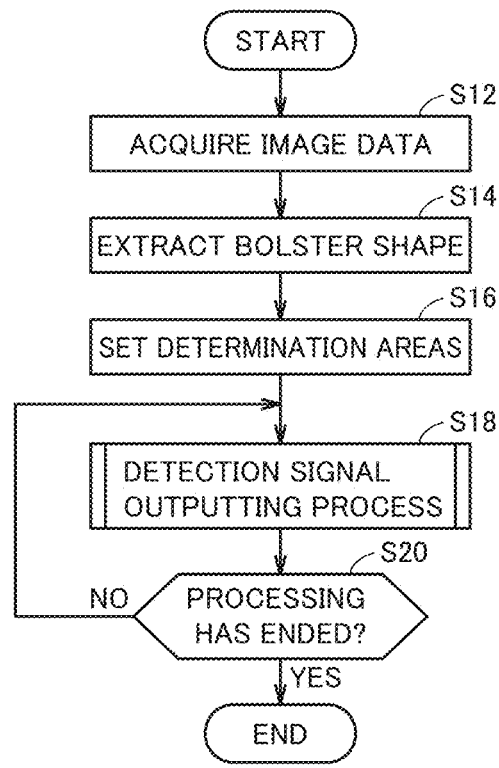
FIG. 24 is a flow diagram illustrating a process flow in another information processor.

FIG. 24 is a flow diagram illustrating a process flow in information processor 30# based on the embodiment.

Referring to FIG. 24, information processor 30# acquires image data (step S12). Specifically, acquisition unit 31 acquires background image data from sensor 20.

Then, information processor 30# extracts a bolster shape (step S14). Specifically, setting unit 323 extracts the bolster shape based on the background image data acquired by acquisition unit 31.

Then, information processor 30# sets determination areas (step S16). Specifically, setting unit 323 sets a plurality of determination areas as described with reference to FIG. 23 based on the extracted bolster shape.

Then, information processor 30# performs a detection signal outputting process (step S18). The detection signal outputting process will be described later in detail.

Then, information processor 30# determines whether or not the processing has ended (step S20) Specifically, it can be determined that the processing has ended when the process of press machine 10 has ended.

When it is determined that the processing has ended in step S20 (YES in step S20), information processor 30# causes the process flow to end (END).

When it is determined that the processing has not ended in step S20 (NO in step S20), on the other hand, information processor 30# causes the process flow to return to step S18, where the detection signal outputting process is performed.

Figure 25:
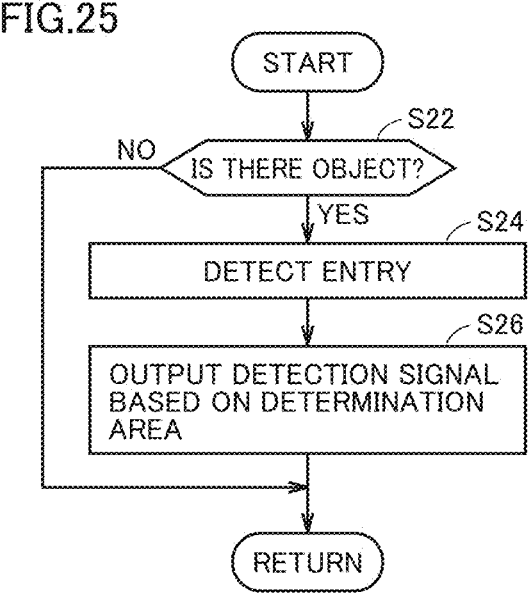
FIG. 25 is a flow diagram illustrating a subroutine of a detection signal outputting process.

FIG. 25 is a flow diagram illustrating a subroutine of the detection signal outputting process.

Referring to FIG. 25, information processor 30# determines whether or not there is an object (step S22). As described above, it is determined whether or not there is an object by HOG processing unit 321 and similarity calculation unit 322. Specifically, difference data between the background image data and the current state image data acquired by acquisition unit 31 is calculated, to distinguish the area of operator 90 and the area of short size plate 80 in accordance with the mode described with reference to FIG. 19. Thus, it is determined whether or not there is an object (the area of operator 90) other than short size plate 80 which is a workpiece and press machine 10.

When it is determined that there is an object in step S22 (YES in step S22), information processor 30# detects entry of the object (step S24).

Detection unit 324 detects entry of the distinguished object into each of the plurality of determination areas. When it is determined that the object is in a plurality of determination areas, detection unit 324 preferentially detects a determination area of the smallest number (determination area of a small area). For example, when the object is detected in determination areas A6 to A8, it is determined that the object has been detected in determination area A6 (that the object has entered determination area A6).

Then, information processor 30# outputs a detection signal based on the determination area (step S26). Detection unit 324 outputs a detection signal based on the determination area based on the detection result. For example, when it is determined that the object has been detected in determination area A6, detection unit 324 may output a signal indicating that the object has been detected in determination area A6. Alternatively, detection unit 324 may output information concerning an area number.

Then, information processor 30# causes the detection signal outputting process to end (RETURN).

When it is determined that there is no object in step S22 (NO in step S22), information processor 30# causes the detection signal outputting process to end (RETURN).

FIG. 26 is a diagram illustrating an operation speed limitation table included in speed control unit 161.

Referring to FIG. 26, the operation speed limitation table is a table that associates a detected area and speed.

Speed control unit 161 outputs a control signal relating to the speed limit to press machine 10, in accordance with the detection signal based on the determination area from information processor 30#.

Specifically, when the object is detected in determination area A1, a control signal indicating a stop is output. When the object is detected in determination area A2, a control signal indicating the setting of the speed to 10% is output. In accordance with this control signal, a target speed set in press machine 10 (speed of slide 14 and the like) is limited to a speed of a prescribed percentage. When the object is detected in determination area A3, a control signal indicating the setting of the speed to 20% is output. When the object is detected in determination area A4, a control signal indicating the setting of the speed to 30% is output. When the object is detected in determination area A5, a control signal indicating the setting of the speed to 40% is output. When the object is detected in determination area A6, a control signal indicating the setting of the speed to 60% is output. When the object is detected in determination area A7, a control signal indicating the setting of the speed to 80% is output. When the object is detected in determination area A8, the speed is 100%. Thus, the operation speed is not limited. In this case, a control signal indicating the setting of the speed to 100% may be output, or the control signal for limiting the speed may not be output.

For example, when a signal indicating that the object has been detected in determination area A6 is received from information processor 30#, speed control unit 161 outputs the control signal indicating the setting of the speed to 60%. The speed of press machine 10 is thus appropriately limited, thereby ensuring the safety of operator 90, for example.

In this example, the plurality of determination areas are set in accordance with the bolster shape included in the machining area, and the speed of press machine 10 is limited based on the determination area in which the entry of the object has been detected.

Thus, the entry of the object into the machining area from various directions can be detected, thus allowing for appropriate control of the speed of press machine 10.

In addition, press controller 16# includes notification unit 162. Notification unit 162 performs a prescribed notification process in response to the detection signal based on the determination area based on the detection result.

Specifically, the volume of a notification signal can be changed depending on the determination area. For example, the volume of alarm sound can be increased as the distance from determination area A1 decreases. Alternatively, instead of sound, a warning may be indicated by displaying a message. For example, the size of characters of the displayed message may be changed, or a display process such as blinking may be performed, as the distance from determination area A1 decreases.

Moreover, although the above description describes distinguishing the area of short size plate 80 from the area of operator 90 to determine the area of operator 90 to be an object, when the inclined area inclined at a prescribed angle is equal to or larger than the predetermined size, the portion of this area may be determined to be an object, as was described with respect to the determination of inclination of the worked surface of short size plate 80 above.

Then, by limiting the operation speed based on the determination result, decrease in machining accuracy can be prevented, thereby maintaining the pressing process with high accuracy. In addition, safer pressing operation than heretofore possible can be implemented. If the configuration is such that the pressing process is stopped when the inclined area is equal to or larger than the predetermined size as described above, a forming process can be prevented from being performed when the worked surface is not horizontally placed.

Although the embodiments of the present invention have been described, it should be understood that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. A controller for controlling operation of a forming machine for forming a workpiece, comprising:
   a non-transitory memory storing information; and
   one or more hardware processors coupled to the non-transitory memory and configured to read instructions from the non-transitory memory to cause the controller to perform operations comprising:
      acquiring, from a depth sensor which outputs image data for determining a distance in a height direction by sensing a predetermined area including a machining area of the forming machine, first image data not including an image of the workpiece and an operator of the forming machine, and second image data representing a current state of the predetermined area during operation of the forming machine, as the image data;
      calculating difference data indicating a difference between the first image data and the second image data;
      determining an area of the workpiece based on the difference data;
      determining a flat area of the workpiece as the determination of the area of the workpiece, wherein the workpiece has a flat worked surface;
      determining an area of the operator in the predetermined area based on the difference data; and
      controlling operation speed of the forming machine based on the difference data.

2. The controller according to claim 1, the operations further comprising:
   dividing a difference image based on the difference data into a plurality of cells, and to calculate a HOG (Histogram of Oriented Gradients) feature value in the difference data for each of the cells, and
   calculating similarity between the HOG feature value and a feature value of a shape of the workpiece for each of the cells, and
   wherein the area of the operator and the area of the workpiece is determined based on the calculated similarity.

3. The controller according to claim 2, wherein the operations further comprise:
   determining that an area including a prescribed proportion or more of the cells in which the similarity is less than a reference value is the area of the operator.

4. The controller according to claim 2, wherein the operations further comprise:
   determining that an area including a prescribed proportion or more of the cells in which the similarity is equal to or greater than a reference value is the area of the workpiece.

5. The controller according to claim 1, the operations further comprising:
   dividing a difference image based on the difference data into a plurality of cells, and to calculate a normal vector of an edge portion in the difference data for each of the cells, and
   calculating similarity between the normal vector and a vector representing a feature of a shape of the workpiece for each of the cells, and
   wherein the area of the operator and the area of the workpiece is determined based on the calculated similarity.

6. The controller according to claim 5, wherein the operations further comprise:
   determining that an area including a prescribed proportion or more of the cells in which the similarity is less than a reference value is the area of the operator.

7. The controller according to claim 5, wherein the operations further comprise:
   determining that an area including a prescribed proportion or more of the cells in which the similarity is equal to or greater than a reference value is the area of the workpiece.

8. The controller according to claim 1, wherein the operations further comprise:
   determining an inclined area inclined at a prescribed angle based on the difference data, and
   limiting the operation speed when the inclined area is equal to or larger than a predetermined size.

9. A forming machine for forming a workpiece, comprising:
   a body having a machining area where the workpiece is machined;
   a controller for controlling operation of the forming machine; and
   a depth sensor which outputs image data for determining a distance in a height direction by sensing a predetermined area including the machining area of the forming machine, the controller being configured to:

acquire, from the depth sensor, first image data not including an image of the workpiece and an operator of the forming machine, and second image data representing a current state of the predetermined area during operation of the forming machine, as the image data, determine all area of the workpiece based on the difference data;

determine a flat area f the workpiece as the determination of the area of the, workpiece, wherein the workpiece has a flat worked surface;

determine an area of the operator in the predetermined area based on difference data indicating a difference between the first image data and the second image data, and control operation of the forming machine based on a result of the determination.

10. The forming machine according to claim 9, wherein the depth sensor is mounted on the body above the machining area.

11. A control method for controlling operation of a forming machine for forming a workpiece, comprising:

acquiring, from a depth sensor which outputs image data for determining a distance in a height direction by sensing a predetermined area including a machining area of the forming machine, first image data not including an image of the workpiece and an operator of the forming machine, as the image data;

after acquiring the first image data, acquiring, from the depth sensor, second image data representing a current state of the predetermined area during operation of the forming machine, as the image data;

calculating difference data indicating a difference between the first image data and the second image data;

determining an area of the workpiece based on the difference data;

determining a flat area of the workpiece as the determination of the workpiece, wherein the workpiece has a flat worked surface;

determining an area of the operator in the predetermined area based on the difference data; and controlling operation of the forming machine based on a result of the determination.

12. A controller for controlling operation of a forming machine for forming a workpiece, comprising:

a non-transitory memory storing information; and one or more hardware processors coupled to the non-transitory memory and configured to read instructions from the non-transitory memory to cause the controller to perform operations comprising:

acquiring, from a sensor which outputs image data for determining a distance in a height direction by sensing a predetermined area including a machining area of the forming machine, first image data not including an image of the workpiece and an operator of the forming machine, and second image data representing a current state of the predetermined area during operation of the forming machine, as the image data;

calculating difference data indicating a difference between the first image data and the second image data;

determining an area of the operator in the predetermined area and an inclined area inclined at a prescribed area based on the difference data; and controlling operation speed of the forming machine based on the difference data, wherein the operation speed is limited when the inclined area is equal to or larger than a predetermined size.

* * * * *